United States Patent
Okamoto et al.

(10) Patent No.: US 7,841,773 B2
(45) Date of Patent: Nov. 30, 2010

(54) TAPERED ROLLER BEARING

(75) Inventors: Yuuji Okamoto, Shizuoka-ken (JP);
Takashi Tsujimoto, Shizuoka-ken (JP);
Jiro Mochizuki, Shizuoka-ken (JP);
Yasuhiro Kanbori, Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 1130 days.

(21) Appl. No.: 11/249,740

(22) Filed: Oct. 14, 2005

(65) Prior Publication Data
US 2009/0324155 A1 Dec. 31, 2009

(30) Foreign Application Priority Data

| Oct. 15, 2004 | (JP) | ............................. 2004-301865 |
| Oct. 15, 2004 | (JP) | ............................. 2004-301866 |
| Oct. 15, 2004 | (JP) | ............................. 2004-301867 |
| Oct. 15, 2004 | (JP) | ............................. 2004-301868 |
| Oct. 15, 2004 | (JP) | ............................. 2004-301869 |

(51) Int. Cl.
*F16C 33/58* (2006.01)
*F16C 33/36* (2006.01)

(52) U.S. Cl. ........................................ 384/571; 384/450

(58) Field of Classification Search ................ 384/450, 384/564, 565, 571, 625, 912, 913
See application file for complete search history.

(56) References Cited

U.S. PATENT DOCUMENTS

| 6,547,443 | B2 * | 4/2003 | Hanai et al. ................. 384/571 |
| 7,147,382 | B2 * | 12/2006 | Suzuki et al. ............... 384/569 |
| 2002/0044707 | A1 | 4/2002 | Hanai et al. |
| 2002/0102041 | A1 | 8/2002 | Matsuyama et al. |
| 2002/0168127 | A1 | 11/2002 | Joki |
| 2002/0186908 | A1 * | 12/2002 | Tsujimoto et al. ........... 384/450 |
| 2003/0123769 | A1 * | 7/2003 | Ohki .......................... 384/492 |

(Continued)

FOREIGN PATENT DOCUMENTS

JP 2000-161348 6/2000

(Continued)

OTHER PUBLICATIONS

Robert G. Campbell, Integrated Product Design and Manufacturing Using Geometric Dimensioning and Tolerancing, 2003, p. 73-74.*

*Primary Examiner*—Thomas R Hannon
*Assistant Examiner*—Phillip A Johnson
(74) *Attorney, Agent, or Firm*—Arent Fox LLP

(57) ABSTRACT

A tapered roller bearing comprises an inner ring having a conical surface-like raceway surface in it outer periphery and formed with a cone back face rib and a cone front face rib on the opposite sides of the raceway, an outer ring having a conical surface-like raceway in its inner periphery, a plurality of tapered rollers interposed between the raceways of the inner and outer rings, and a cage for holding the tapered rollers in predetermined circumferential intervals, wherein the ratio $R/R_{BASE}$ of the radius of curvature R of the large end face (32) of the tapered roller (30) to the distance $R_{BASE}$ from the apex of cone of the tapered roller (30) to the cone back face rib surface (18) of the inner ring (10) is set at 0.75 to 0.87, and the end face deflection of the large end face (32) of the tapered roller (30) is 3 μm or less.

18 Claims, 13 Drawing Sheets

U.S. PATENT DOCUMENTS

| | | |
|---|---|---|
| 2004/0047528 A1 | 3/2004 | Tsujimoto et al. |
| 2004/0170348 A1 | 9/2004 | Okugami et al. |

FOREIGN PATENT DOCUMENTS

| | | |
|---|---|---|
| JP | 2000-161349 | 6/2000 |
| JP | 2000-170774 | 6/2000 |
| JP | 2002-122146 | 4/2002 |
| JP | 2002-221223 | 8/2002 |
| JP | 2004-522923 | 7/2004 |
| JP | 2004-278782 | 10/2004 |

* cited by examiner

R: RADIUS OF CURVATURE OF ROLLER LARGE END FACE

TAPERED ROLLER BEARING

BACKGROUND OF THE INVENTION a. Field of the Invention

This invention relates to a tapered roller bearing.

b. Description of the Prior Art

A tapered roller bearing is a radial bearing using tapered rollers as rolling elements and, as shown in FIG. 2, it is composed of an inner ring 10, an outer ring 20, tapered rollers 30, and a cage 40. The inner ring 10 has a conical surface-like raceway 12 in its outer periphery, and a cone front face rib 14 and a cone back face rib 16 on opposite sides of the raceway. The outer ring 20 has a conical surface-like raceway 22 in its inner periphery. The tapered rollers 30 are rollably interposed between the raceways 12 and 22 of the inner and outer rings 10 and 20. The cage 40 has a plurality of pockets circumferentially disposed at predetermined circumferential intervals, with each pocket having a tapered roller 30 received therein.

The tapered roller bearing is designed so that the tapered rollers 30 are in linear contact with the raceways 12 and 22 of the inner and outer rings 10 and 20 and so that, as shown in FIG. 1, the raceways 12 and 22 of the inner and outer rings 10 and 20 and the apexes of the tapered rollers 30 focus at a point O on the center axis of the bearing, making it possible to receive radial load and one-way axial load. The raceways 12 and 22 of the inner and outer rings 10 and 20 differ in conical angle from each other, so that the resultant of forces of loads applied from the raceways to the tapered rollers 30 acts in a direction to push the tapered rollers 30 to the cone back face rib 16 of the inner ring 10. Therefore, the tapered rollers 30 are guided in a state in which their large end faces 32 are pushed against the cone back face rib 16, where slide contact occurs. Specifically, as shown in FIG. 3, the cone back face rib surface 18 is a flat surface with its generatrix y forming a predetermined angle with the center axis; the large end face 32 of the tapered roller 30 makes slide contact with this flat surface.

SUMMARY OF THE INVENTION

The tapered roller bearing is capable of supporting large one-way axial load at the same time as large radial load. Since the large end face 32 of the tapered roller 30 makes slide contact with the cone back face rib surface 18, which is flat, of the inner ring 10, however, the running torque is relatively large and the limit of rotative speed is generally not high.

For example, recent railway vehicles demands high speeds exceeding 200-300 km per hour, and the situation around bearings for drive unit pinions is such that they almost reach dn $\square 50 \times 10^4$ in splash lubrication. Besides, it is required that no seizure should occur even under low temperature quick acceleration conditions which tend to increase heat value as in winter. It is insufficient for the prior tapered roller bearing technology to cope with such severe conditions.

The tapered roller bearing of this invention is characterized by comprising an inner ring having a conical surface-like raceway in its outer periphery and formed with a cone back face rib and a cone front face rib on opposite sides of the raceway, an outer ring having a conical surface-like raceway in its inner periphery, a plurality of tapered rollers interposed between the raceways of the inner and outer rings, and a cage for holding the tapered rollers at predetermined circumferential intervals, wherein the ratio $R/R_{BASE}$ of the radius of curvature R of the large end face of the tapered roller to the distance $R_{BASE}$ from the apex of cone of the tapered roller to the cone back face rib surface of the inner ring is set at 0.75 to 0.87, and the end face deflection of the large end face of the tapered roller is 3 µm or less.

The radius of curvature R of the large end face of the roller has conventionally been $0.90 \square R/R_{BASE} \square 0.97$ ($R_{BASE}$: the distance from the apex of cone of the tapered roller to the cone back face rib surface of the inner ring). In this case, the minimum oil film thickness ratio between the cone back face rib surface and the large end face of the tapered roller is 0.9 or less, a value which has not been absolutely satisfactory for high speed rotation. We have experimentally found that the optimum value of R that enables said minimum oil film thickness ratio to be 0.95 or more is such that $0.75 \square R/R_{BASE} \square 0.87$, having embodied this concept.

Further, conventionally, the allowable value of end face deflection has been set at 4 µm even in the case of the lowest class (the nominal diameter Dw of the tapered roller is from 3 mm to 10 mm). Reducing the end face deflection of the large end face of the tapered roller to 3 µm or less reduces variations in contact pressure between the cone back face rib surface of the inner ring and the large end face of the tapered roller, thus reducing the factor which inhibits oil film formation.

The surface roughness of the large end face of the tapered roller may be set at 0.02 µm Ra. Employing such arrangement reduces the surface roughness relative to the oil film thickness, thus reducing the factor which inhibits oil film formation. More specifically, if the surface roughness is large relative to the oil film thickness, this will result in metal contact, whereas if it is small, metal contact never occurs, not breaking oil films.

This invention provides a tapered roller bearing wherein the ratio $R/R_{BASE}$ of the radius of curvature R of the large end face of the tapered roller to the distance $R_{BASE}$ from the apex of cone of the tapered roller to the cone back face rib surface of the inner ring is set at 0.75 to 0.87, and the end face deflection of the large end face of the tapered roller is 3 µm or less, thereby enhancing optimum oil film formation between the cone back face rib of the inner ring and the large end face of the tapered roller and improving anti-seizurability and anti-pre-pressure escapability. Pre-pressure escape, as is well-known, refers to a phenomenon in which pre-pressure gradually decreases due to friction or the like.

These and other objects and features will become more apparent from the following description with reference to the attached drawings.

BEST MODE FOR CARRYING OUT THE INVENTION

First Embodiment

Figure 1:
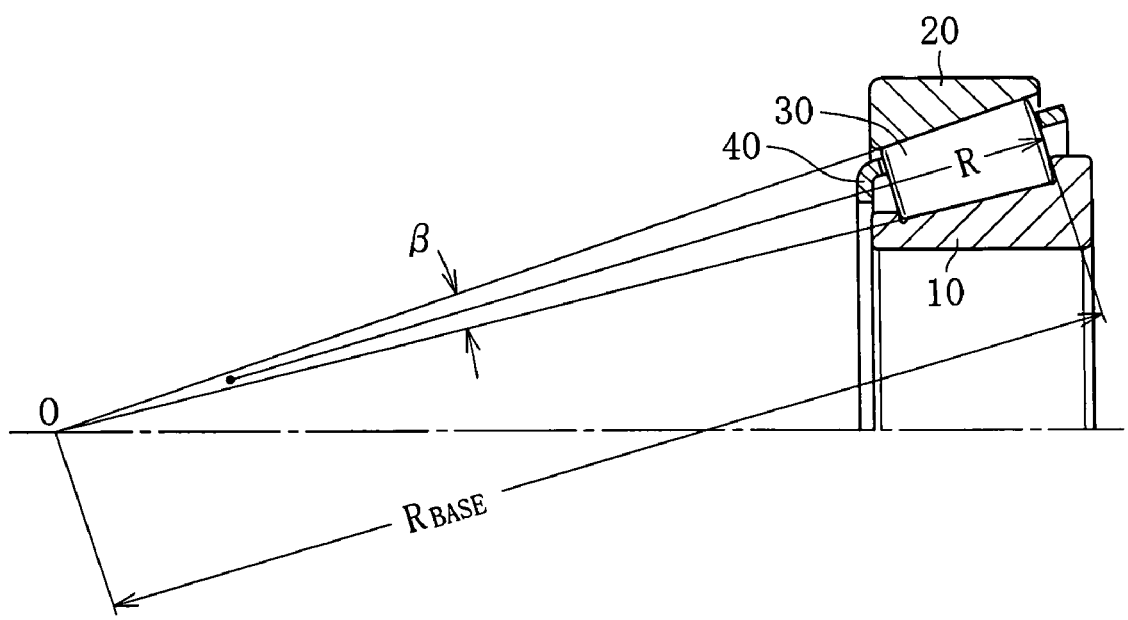
FIG. 1 is a longitudinal sectional view of a tapered roller bearing showing an embodiment of the invention.
Figure 2:
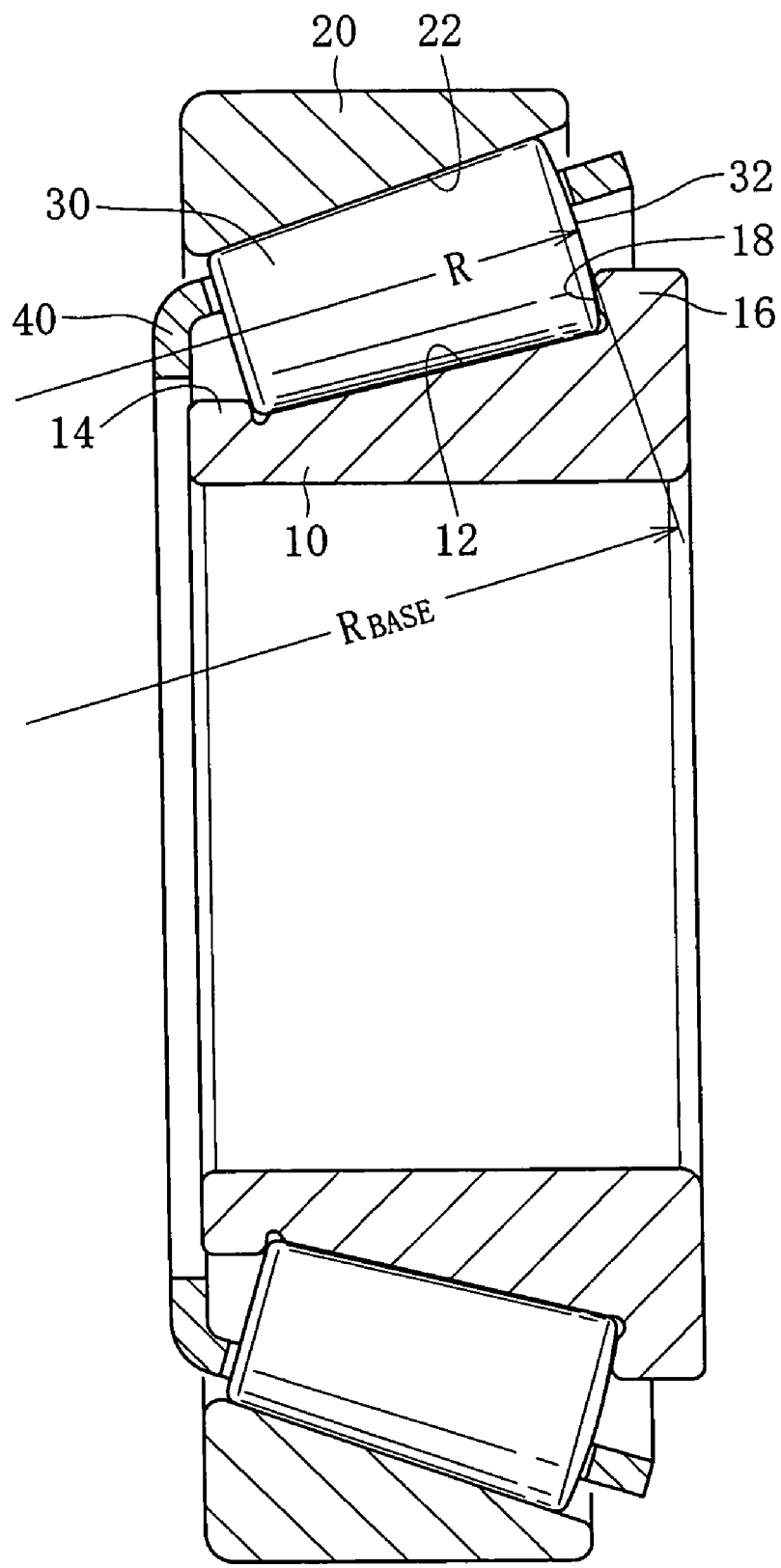
FIG. 2 is an enlarged view of the tapered roller bearing of FIG. 1.

As shown in FIGS. 1 and 2, a tapered roller bearing is composed of an inner ring 10, an outer ring 20, tapered rollers 30, and a cage 40. The inner ring 10 has a tapered roller-like raceway 12 in its outer periphery and is provided with a cone front face rib 14 and a cone back face rib 16 on opposite sides of the raceway 12. The character 18 denotes the surface of the inner ring 10 in contact with the cone back face rib surface, i.e., the large end face 32 of the tapered roller 30. The outer ring 20 has a tapered roller-like raceway 22 in its inner periphery. The tapered rollers 30 are rollably interposed between the raceways 12 and 22 of the inner and outer rings 10 and 20. The cage 40 has a plurality of pockets circumferentially disposed at predetermined circumferential intervals, with each pocket having a tapered roller 30 received therein.

The tapered rollers 30 are in linear contact with the raceways 12 and 22 of the inner and outer rings 10 and 20, the design being such that the raceways 12 and 22 of the inner and outer rings 10 and 20 and the apexes (O) of the cone (conical angle: β) of the tapered rollers 30 focus at a point O on the bearing center axis (FIG. 1). The raceways 12 and 22 of the inner and outer rings 10 and 20 differ in conical angle from each other, so that the resultant of forces of loads applied from the raceways 12 and 22 to the tapered rollers 30 acts in a direction to push the tapered rollers 30 to the cone back face rib 16 of the inner ring 10. Therefore, the tapered rollers 30 are guided in a state in which their large end faces 32 are pushed against the cone back face rib surface 18 of the inner ring 10, where the two make slide contact with each other.

The radius of curvature R of the large end face 32 of the tapered roller 30 is set such that $0.75 \leq R/R_{BASE} \leq 0.87$, where $R_{BASE}$ is the distance from the apex (O) to the cone back face rib surface 18 of the inner ring 10. In other words, the ratio $R/R_{BASE}$ of the radius of curvature R of the large end face 32 of the tapered roller 30 to the distance $R_{BASE}$ from the apex of cone of the tapered roller 30 to the cone back face rib surface 18 of the inner ring is set at 0.75 to 0.87. The reason why the ratio $R/R_{BASE}$ of the radius of curvature R of the large end face of the tapered roller to the distance $R_{BASE}$ from the apex of the cone of the tapered roller has been set at 0.75-0.87 is as follows.

The radius of curvature R of the roller large end face, conventionally, has been such that $0.90 \leq R/R_{BASE} \leq 0.97$. In this case, the minimum oil film thickness ratio between the cone back face rib surface and the large end face of the tapered roller is 0.9 or less, a value which has not been absolutely satisfactory for high speed rotation. We have experimentally found that the optimum value of R that enables said minimum oil film thickness ratio to be 0.95 or more is such that $0.75 \leq R/R_{BASE} \leq 0.87$, having embodied this concept.

Figure 4:
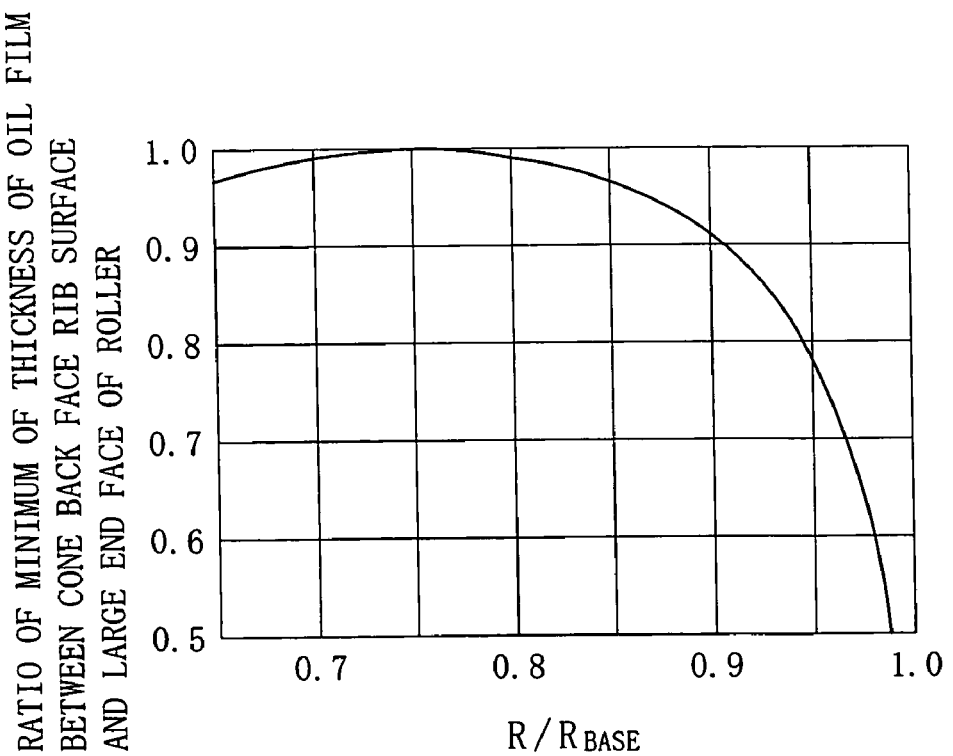
FIG. 4 is a graph showing the influences of the radius of curvature R of the tapered roller large end face on oil film thickness.

The influences of the large end face 32 of the tapered roller 30 on oil film thickness have been found from the KARNA formula and are graphically shown in FIG. 4. The same figure shows the results of calculations of oil film thickness t formed between the inner ring cone back face rib surface and the tapered roller large end face by using the KARNA formula. The horizontal axis of the same figure indicates $R/R_{BASE}$, and the vertical axis indicates the ratio $t/t_0$ of oil film thickness t to oil film thickness $t_0$ when $R/R_{BASE}=0.76$. As is clear from the same figure, the oil film thickness t is at the maximum when $R/R_{BASE}=0.76$, and if $R/R_{BASE}$ exceeds 0.9, it rapidly decreases. Further, in the conventional range of $0.90 \leq R/R_{BASE} \leq 0.97$, it is seen that oil films are relatively thin. It is in the range of $0.65 \leq R/R_{BASE} \leq 0.87$ that the oil film thickness ratio is 0.95 or more. When $R/R_{BASE}<0.75$ in this range, the contact area of the large end face 32 becomes relatively small, with the result that the contact surface pressure is high, a fact which, on the contrary, is disadvantage to anti-seizurability, as has been experimentally confirmed. Therefore, the optimum value of the radius of curvature R has, after all, been found to be in the range of $0.75 \leq R/R_{BASE} \leq 0.87$.

Figure 5:
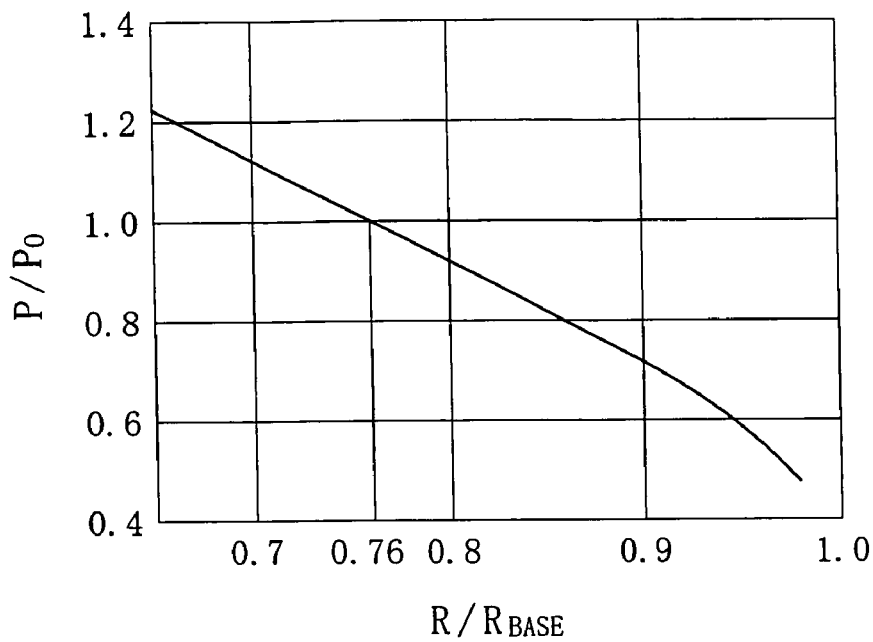
FIG. 5 is a graph showing the relationship between the radius of curvature of the tapered roller large end face and maximum hertz stress.

FIG. 5 shows the results of calculations of the maximum Hertz stress p between the inner ring cone back face rib surface and the tapered roller large end face. In the same figure, the horizontal axis indicates $R/R_{BASE}$ and the vertical axis, as in the case of FIG. 4, indicates the ratio $p/p_0$ of the maximum Hertz stress p to the maximum Hertz stress $p_0$ when $R/R_{BASE}=0.76$. As is clear from the same figure, the maximum Hertz stress p monotonically decreases with increasing $R/R_{BASE}$.

In order to reduce torque loss and heat generation due to slide friction between the inner ring cone back face rib surface and the tapered roller large end face, it is desirable to increase the oil film thickness t and to decrease the maximum Hertz stress p. Using the results of calculations in FIGS. 4 and 5 for reference, we have determined, on the bass of the results of anti-seizure tests shown in Table 1 given below, that the proper range of $R/R_{BASE}$ is 0.75-0.87.

Figure 6:
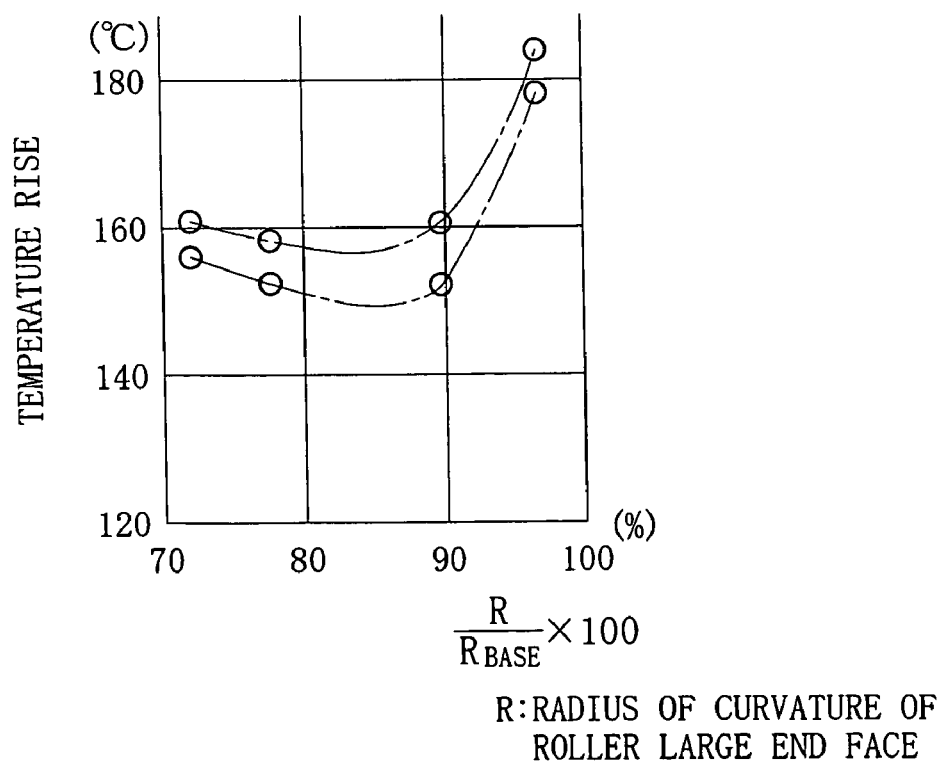
FIG. 6 is a graph showing the relationship between the radius of curvature R of the tapered roller large end face and bearing temperature rise.

FIG. 6 shows test results indicating that too small or too large a value of $R/R_{BASE}$ is disadvantageous for anti-seizurability. In these tests, bearings (Model Number M86649/10) were used. The values of radius of curvature R of the tapered rollers 30 were of four kinds, that is, tapered rollers were different such that when expressed in terms of $R/R_{BASE}$, they were 0.72, 0.78, 0.90, and 0.97. Such tapered rollers were incorporated into a total of eight bearings, two-in-a-set.

The bearings were placed under the conditions of 7000 rpm and a load of 650 kgf, and temperature rises of the outer peripheral surfaces of the outer rings were measured under the action of lubricating oil. The experimental results have confirmed that the ranges of $R/R_{BASE}<0.75$ and $0.87<R/R_{BASE}$ are regions where the tendency for temperature to rise is clearly shown, a fact which is disadvantageous for anti-seizurability.

Figure 7:
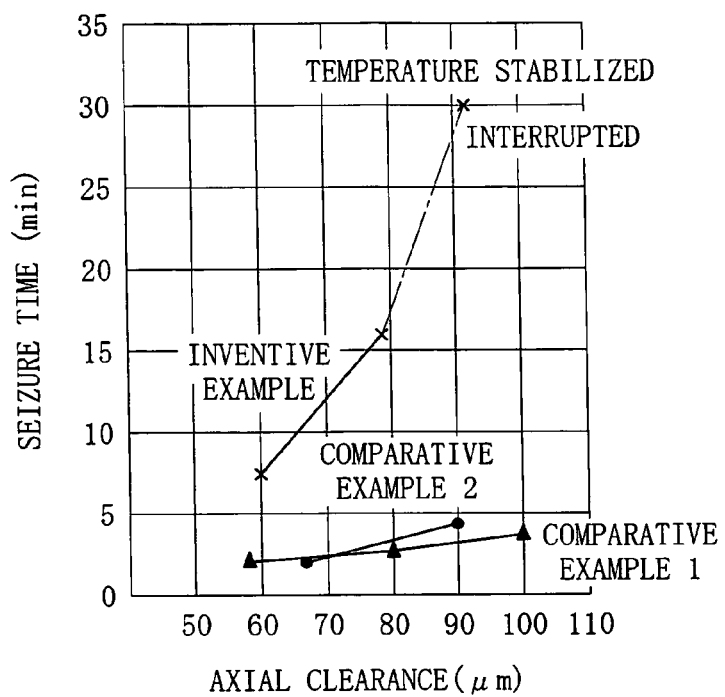
FIG. 7 is a graph showing the relationship between axial clearance and seizure time.

FIG. 7 shows the results of seizure tests for tapered roller bearings, wherein the horizontal axis indicates axial clearance and the vertical axis indicates seizure time (in minutes). In these tests, use is made of bearings in which the values of radius of curvature R of the large end faces of tapered rollers are changed. That is, the value of $R/R_{BASE}$ is 0.97 for the comparative example 1, 0.90 for the comparative example 2, and 0.78 for the embodiment. In the comparative examples 1 and 2, seizure occurred within five minutes even if the axial clearance was increased to about 100 μm, whereas in the bearing of the embodiment, the temperature became stabilized for an axial clearance of about 90 μm, with no seizure observed.

Figure 8A:
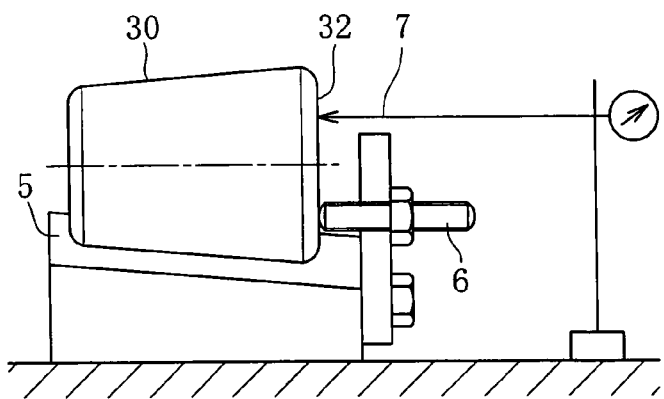
FIG. 8A is a front view of an end face deflection measuring device.
Figure 8B:
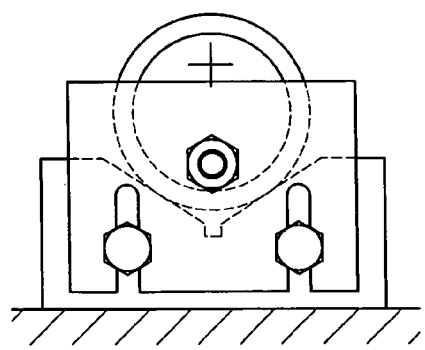
FIG. 8B is a side view of the end face deflection measuring device.

The large end face 32 of the tapered roller 30 should be limited to an end face deflection of 3 μm or less, more preferably, to 1 μm or less. The end face deflection is measured in accordance with the method defined by JIS B 1506. specifically, as shown in FIGS. 8A and 8B, the tapered roller 30 is placed on support block 5 and brought into point contact with a patch 6 at a point close to the periphery of the large end face 32. In this end face, the contact point is applied to a measuring instrument 7 at a position symmetrical with respect to the center axis of the tapered roller 30, and the tapered roller 30 is rotated. The end face deflection of the tapered roller 30 is found as a difference between the maximum and minimum readings taken on the measuring instrument when the tapered roller 30 is rotated by one turn.

Further, the large end face 32 of the tapered roller 30 is honed and the surface roughness should be 0.020 μm Ra or less. In this connection, conventionally, it has been 0.063 μm Ra or less. In addition, conventionally, it has been 0.063 μm Ra or less. In addition, the surface roughness of the large end face 32 of the tapered roller 30 is such that as the processing limit, for example, 0.01 is the lower limit.

In order to confirm the influences of the radius of curvature R of the large end face 32 of the tapered roller 30 on anti-seizurability, seizure tests were conducted. Test conditions are as follows.

Test bearings: 30206

$R/R_{BASE}$ (%): 80 (embodiment)/95 (comparative example

End face deflection: 1 μm

Surface roughness: 0.02 μm Ra

Rotative speed: 5000 rpm (V=6.2 m/s)

The results of the seizure tests are shown in Table 1. In addition, the symbol ○ indicates no seizure, × indicates seizure, and □ indicates no test conducted.

TABLE 1

|  | Inner ring cone back face rib surface contact surface pressure (kgf/mm²) | | |
| --- | --- | --- | --- |
| $R/R_{BASE}$ (%) | 5.5 | 6.4 | 7.0 |
| 80 | ○ | ○ | ○ |
| 95 | × | × | □ |

As is clear from Table 1, one in which $R/R_{BASE}$ is 80% (embodiment) showed no seizure even when the contact surface pressure in the inner ring cone back face rib surface was 7.0 kgf/mm². On the other hand, one in which $R/R_{BASE}$ is 95% (comparative example) showed seizure even when the contact surface pressure in the inner ring cone back face rib surface was reduced to 5.5 kgf/mm². It is understood from this that satisfactory anti-seizurability can be obtained if $R/R_{BASE}$ is in the range of 0.75 to 0.87. Further, since optimum oil film formation can be realized, it can be easily assumed that abrasion of the tapered roller large end face and inner ring cone back face rib surface is prevented and that anti-pre-pressure escapability is improved.

Second Embodiment

A description will be given of the second embodiment of the invention corresponding to a modification of the first embodiment described above.

Tapered roller bearings are bearings suitable for being loaded with radial load and axial load and combined load consisting thereof and have a large load capacity. Therefore, in power transmission devices such as differentials and transmissions of vehicles such as automobiles and construction machines, use is made of support devices which support gear shafts by tapered roller bearings. Transmissions for automobiles are classified broadly into the manual type and the automatic type. Further, they can also be classified according to the driving system of the vehicle: a trans-axle for front wheel drive (FWD), a transmission for rear wheel drive (RWD), and a transfer (auxiliary speed changing unit) for four-wheel drive (4WD). They are used to speed-change the drive power from the engine and to transmit it to the drive shaft or the like.

Figure 9:
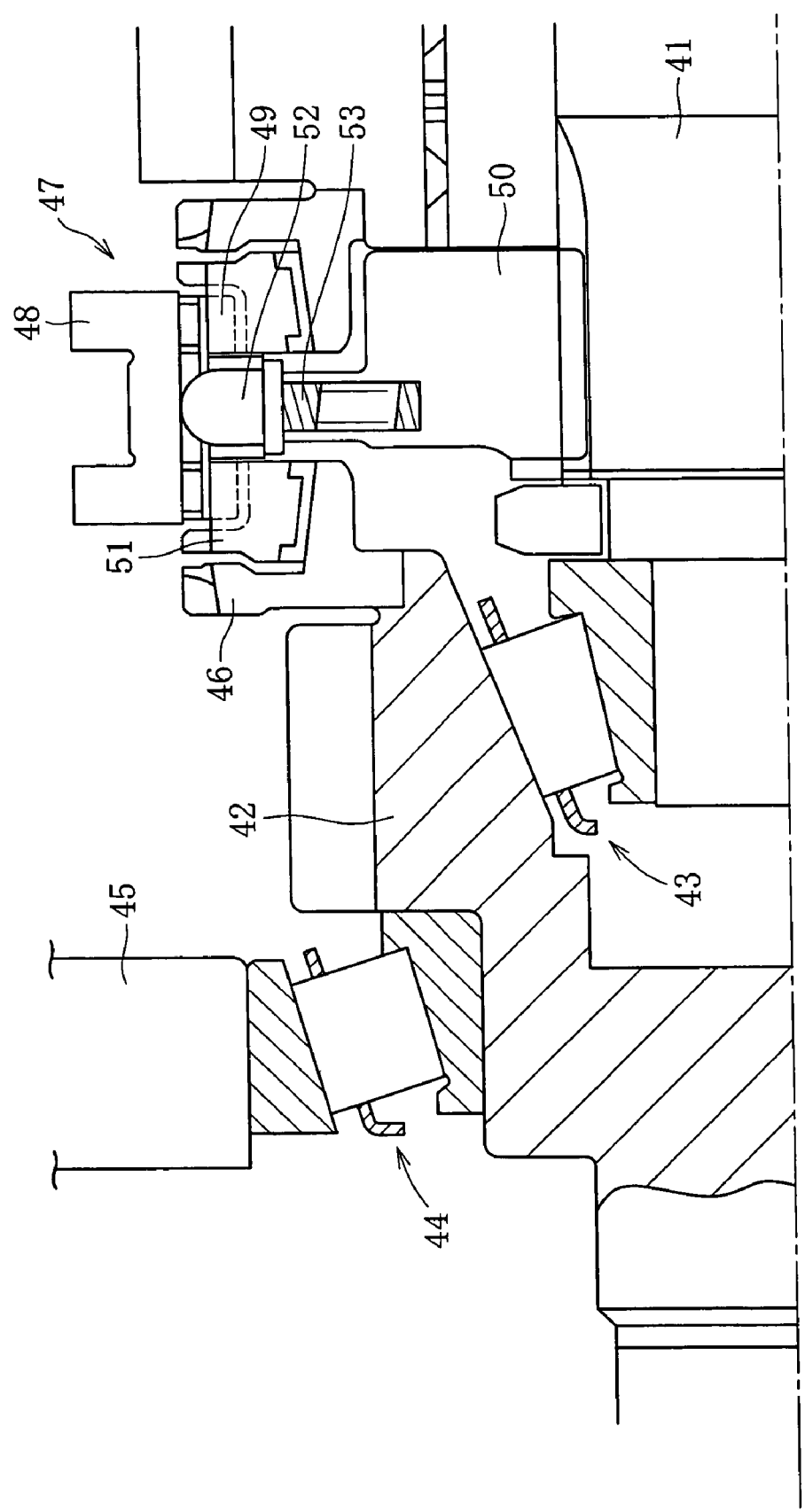
FIG. 9 is a principal longitudinal sectional view of a transmission.

FIG. 9 shows an example of the arrangement of the transmission of an automobile. This transmission is of the synchronous type, in which the left side is the engine side and the right side is the drive wheel side in the same figure. A tapered roller bearing 43 is interposed between a main shaft 41 and a main drive gear 42. In this example, the inner periphery of the main drive gear 42 is directly formed with an outer ring raceway surface for the tapered roller bearing 43. The main drive gear 42 is supported by a tapered roller bearing 44 for rotation relative to a casing 45. A clutch gear 46 is connected by engagement to the main drive gear 42, and a synchro-mechanism 47 is disposed adjacent the clutch gear 46.

The synchro-mechanism 47 comprises a sleeve 48 adapted to be moved axially (in a left-right direction in FIG. 9) by the action of a selector (not shown), a synchronizer key 49 axially slidably installed in the inner periphery of the sleeve 48, a hub 50 connected by engagement to the outer periphery of the main shaft 41, a synchronizer ring 51 slidably installed on the outer periphery (the cone section) of the clutch gear 46, and a hold-down pin 52 and a spring 53 which elastically press the synchronizer key 49 against the inner periphery of the sleeve 48.

In the state shown in FIG. 9, the sleeve 48 and synchronizer key are held in the neutral position by the hold-down pin 52. At this time, the main drive gear 42 runs idle relative to the main shaft 41. On the other hand, when the selector is actuated to cause the sleeve 48 to move axially, for example, axially to the left, from the state shown in the same figure, the synchronizer key 49 moves axially to the left following the sleeve 48, so as to press the synchronizer ring 51 against the inclined surface of the cone section of the clutch gear 46. This decreases the rotative speed of the clutch gear 46 and reversely, increases the rotative speed of the synchro-mechanism 47. And, at about the time when the rotative speeds of the two have synchronized, the sleeve 48 further moves axially to the left, meshing with the clutch gear 46, and the main shaft 41 and the main drive gear 42 are connected to each other through the synchro-mechanism 47. This allows the main shaft 41 and the main drive gear 42 to synchronously rotate.

In this connection, automobile transmissions have recently tended to use low viscosity oil so as to attain AT and CVT for the transmission, low fuel consumption, etc. In an environment where low viscosity oil is used, surface-start abrasion, which results in a very short life, sometimes occurs in the case of simultaneous occurrence of adverse conditions, such as high oil temperature, little oil quantity, and pre-pressure escape.

Concerning heat treating methods for giving a long life to bearing constituent parts against rolling fatigue, there is a method (for example, Japanese Patent Kokai Nos. Hei 8-4774 and Hei 11-101247) for applying a carbonitriding treatment to the surface layer of a bearing constituent part as by adding ammonia gas to an atmosphere RX gas during heating for hardening. Using this carbonitriding method makes it possible to harden the surface layer, to form retained austenite in the microstructure, and to improve rolling fatigue life.

However, since the above carbonitriding method is a diffusion treatment for diffusing carbon and nitrogen, it is necessary to retain the work piece at high temperature for a long time. Therefore, coarsening or the like of the structure occurs, making it difficult to improve anti-crack strength. Further, an increase in secular dimensional change rate due to an increase in retained austenite becomes a problem.

On the other hand, regulating the structure by alloy design of steel makes it possible to secure a long life against rolling fatigue, to improve crack strength, and to prevent an increase in secular dimensional change rate. However, resorting to alloy design produces problems such as high costs for raw materials.

With demand for size reduction and size compaction for transmissions and with demand for having features allowing use at high temperatures under high load conditions, tomorrow's bearing constituent parts in transmissions will be required to have characteristics allowing their use under large load conditions and at higher temperatures. Therefore, bearing constituent parts having a high strength, a long life for rolling fatigue characteristics and having a high degree of anti-crack strength and of dimensional stability will be required.

Accordingly, an object of the second embodiment of the invention is to provide a tapered roller bearing having a high degree of anti-crack strength and of dimensional stability and superior in rolling fatigue life.

A tapered roller bearing according to the second embodiment of the invention comprises an inner ring having a conical surface-like raceway in its outer periphery and formed with a cone back face rib and a cone front face rib on opposite sides of the raceway, an outer ring having a conical surface-like raceway in its inner periphery, a plurality of tapered rollers interposed between the raceways of the inner and outer rings, and a cage for holding the tapered rollers at predetermined circumferential intervals, wherein at least one of the constituent parts, the inner ring, outer ring, and tapered rollers, has a nitrogen rich layer in its surface layer, the grain size number of the austenite crystal grains in said nitrogen rich layer exceeds number 10, and the ratio $R/R_{BASE}$ of the radius of curvature R of the large end face of the tapered roller to the distance $R_{BASE}$ from the apex of cone of the tapered roller to the cone back face rib surface of the inner ring is set at 0.75 to 0.87, and the end face deflection of the large end face of the tapered roller is 3 μm or less.

Since the austenite grain diameter of at least one of the constituent parts, the inner ring, outer ring, and tapered rollers, is minute, anti-crack strength, dimensional stability, and rolling fatigue life are greatly improved. If the grain size number of austenite grain diameter is number 10 or less, the rolling fatigue life will not be improved so much; therefore, it is set in the range exceeding number 10. Normally, it is set at number 11 or more. The smaller the austenite grain diameter, the more desirable. Normally, however, it is difficult to obtain a grain size number which exceeds number 13. In addition, the austenite grains in the inner ring, outer ring, and rolling elements of a shaft support structure in a transmission change neither in the surface layer greatly influenced by the carbonitriding treatment nor in the interior inside the same. Therefore, the positions in which to define the range of crystal grain size number shall be the surface layer and the interior.

In addition, the inner ring or the outer ring in this specification may be one integrated with a member such as a shaft or a housing or it may be a discrete member.

When austenite grains are mentioned, traces are left, after hardening, in a ferrite phase, such as austenite or bainite. There are cases where the term "old" is added in order to emphasize the austenite grain boundary which is present prior to hardening. That is, austenite grains and old austenite grains express the same thing.

It is only necessary that austenite grains have a grain boundary which can be observed by applying a grain boundary revealing treatment, such as etching, to a metal phase sample in the form of a subject member. There are cases of mentioning old austenite grains, as described above, in the meaning of a grain boundary at the time of being heated immediately before low temperature hardening. Measurements may be made by converting the mean value of the grain size numbers according to JIS into the means grain diameter or by taking the mean value of the distance lengths with which a straight line of random direction superposed on the metal phase structure as by microtomy meets the grain boundary.

The nitrogen rich layer, as will be later described, is formed by carbonitriding treatment, and the nitrogen rich layer may or may not be enriched with carbon.

The structure having a nitrogen rich layer can be produced by the heat treating process which follows. That is, the steel for bearing constituent parts is carbonitrided at a carbonitriding temperature exceeding the $A_1$ transformation point, whereupon it is cooled to a temperature below the $A_1$ transformation point. Thereafter, it is reheated to a hardening temperature region above the $A_1$ transformation point and hardened. By effecting final hardening subsequent to cooling to a temperature less than the $A_1$ transformation point after carbonitriding, it is possible to reduce the austenite grain diameter. As a result, Charpy impact value, fracture toughness, crack strength, fatigue life (rolling fatigue life if the constituent part is a rolling bearing or a rolling bearing part) can be improved.

Further, cooling to the temperature at which austenite transforms makes it possible to make the austenite boundary at the time of carbonitriding treatment unrelated to the austenite boundary at the time of final hardening. Further, since the heating temperature at the time of final hardening is lower than the heating temperature at the time of carbonitriding treatment, the unmelted cementite quantity in the surface layer to which the effects of carbonitriding treatment extend increases more than at the time of carbonitriding treatment. Therefore, the proportion of the unmelted cementite quantity at the heating temperature for final hardening increases and the proportion of the austenite quantity lowers, more than at the time of carbonitriding treatment. Furthermore, in the region of coexistence of cementite and austenite in the iron-carbon binary phase diagram, the carbon concentration, with carbon dissolving into austenite, lowers with lowering hardening temperature.

When the work is heated to the final hardening temperature, the unmelted cementite which obstructs the growth of austenite grains is large in quantity, so that the austenite grains are fine. Further, the structure which has transformed from austenite to martensite and bainite is low in carbon concentration by hardening, so that the structure is rich in toughness as compared with the structure hardened from the carbonitriding temperature.

In the above method for producing tapered roller bearings, it is preferable that the hardening temperature region be in the temperature range of 790°-830°. Thereby, the work is reheated to a temperature at which the growth of austenite grains hardly occurs, and is hardened, so that the austenite grain diameter can be made fine.

Further, conventionally, the allowable value of end face deflection has been set at 4 µm even in the case of the smallest class (the nominal diameter Dw of the tapered roller is 3 mm to 10 mm). However, setting the end face deflection of the large end face of the tapered roller at 3 µmm or less reduces variations in contact pressures on the tapered roller large end face and inner ring cone back face rib surface, reducing the factor which inhibits oil film formation.

The breaking stress for the constituent part is preferably 2650 Mpa or more. We have found that the breaking stress for the steel having a nitrogen rich layer can be given 2650 Mpa or more, a value heretofore been impossible to attain, by carbonitriding the steel at carbonitriding temperatures exceeding $A_1$ transformation point, cooling it to a temperature below the A1 transformation point, reheating it to a hardening temperature region above the $A_1$ transformation point, and hardening it. Thereby, a tapered roller bearing can be obtained which, as compared with the prior art, is superior in breaking stress and hence is high in strength.

The hydrogen content of said constituent part is preferably 0.5 ppm or less. Thereby, brittleness of steel due to hydrogen can be reduced. When the hydrogen content of the steel exceeds 0.5 ppm, the crack strength of steel lowers. Therefore, such steel is not suitable for use in a hub support structure subjected to severe loads. It is desirable that hydrogen content be low. However, it takes a long time of heating to reduce it to less than 0.3 ppm, leading to the coarsening of austenite grains, and on the contrary, toughness lowers. Therefore, desirable hydrogen content is in the range of 0.3-0.5 ppm. More desirably, it is in the range of 0.35-0.45 ppm.

In addition, as to the above hydrogen content, diffusible hydrogen is not a subject of measurement, while non-diffusible hydrogen alone discharged from the steel at a predetermined temperature or more is taken up as a subject of measurement. If the sample size is small, the hydrogen is discharged even at normal temperature and lost as it scatters; therefore, diffusible hydrogen is dropped from the subject of measurement. Non-diffusible hydrogen is trapped in the defects of steel; it is discharged only at above a predetermined temperature from the sample and lost as it scatters. Even if restricted to this non-diffusible hydrogen, the hydrogen content varies widely according to measuring methods. Said hydrogen content range is a range according to a measuring method using thermal conductimetry. Further, as will be later described, it is desirable to make measurements by using DH-103 Model hydrogen analyzer made by LECO company or other measuring instrument similar thereto.

Figure 3:
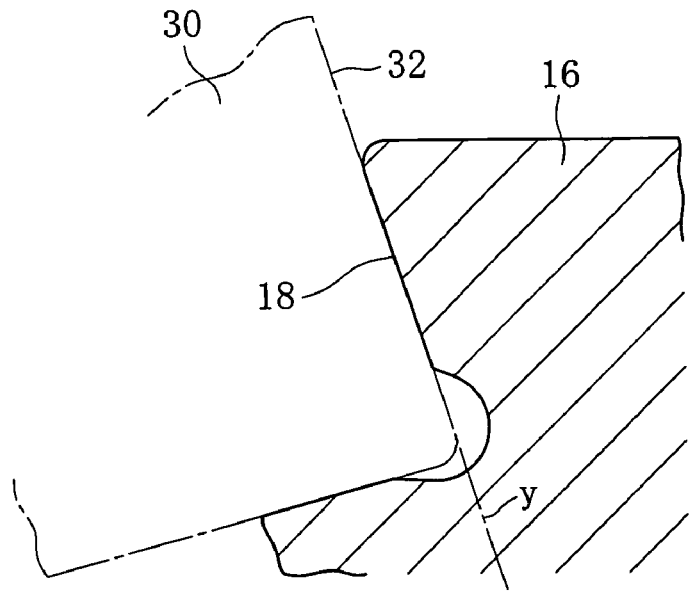
FIG. 3 is an enlarged view of the cone back face rib surface of the inner ring of FIG. 2.

The surface roughness Ra of the cone back face rib of the inner ring is preferably in the range of 0.05 µm-0.20 µm. Employing such arrangement makes it possible, because of the relationship of the oil film thickness t between the cone back face rib surface of the inner ring and the large end face of the tapered roller, to hold the lubrication state between these surfaces in a proper state. For example, the cone back face rib surface 18 (see FIGS. 2 and 3) is grounded to a surface roughness Ra of 0.12 µm.

Figure 10:
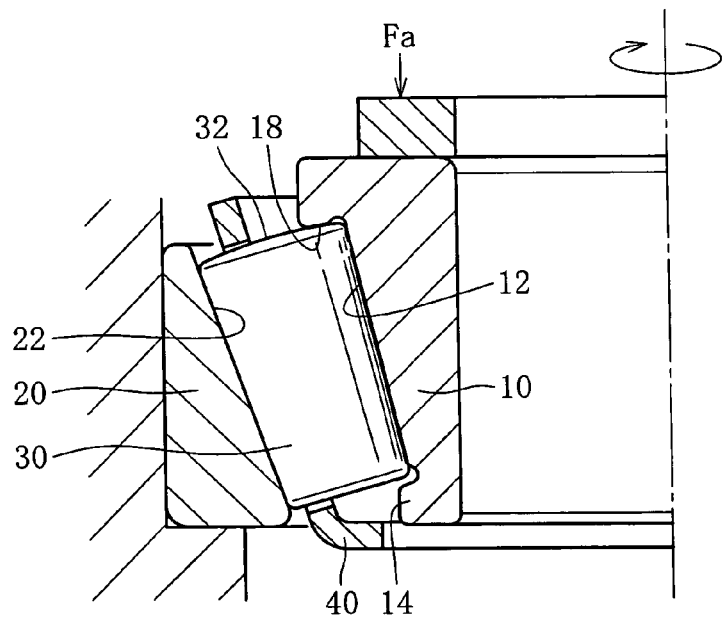
FIG. 10 is a sectional view for explaining a pre-pressurizing operation for tapered roller bearings.

Here, the reason for setting the surface roughness Ra at 0.05 µm or more is as follows. When a tapered roller bearing is to be attached to a shaft, a description will be given of the tapered roller bearing of FIG. 1 taken as an example. As shown in FIG. 10, an axial load Fa is applied to the end face of the inner ring 10, and the tapered roller bearing 30 is moved toward the cone back face rib surface 18 while rotating the shaft at a low speed of about 50-100 rpm, so as to pre-pressurize the large end face 32 of the tapered roller against the cone back face rib surface 18 with a predetermined pressure. This pre-pressurizing is performed to prevent axial movement of the tapered rollers 30 during use of the bearing and to bring the tapered rollers 30 into stable linear contact with the raceway surfaces 12 and 22 of the inner ring 10 and outer ring 20. This pre-pressure is managed by measuring the shaft torque, and the pre-pressurizing operation is completed when the shaft torque assumes a predetermined value.

In the case where the surface roughness Ra is 0.05 µm or less, the lubricating state between the cone back face rib surface 18 of the inner ring 10 and the large end face 32 of the tapered roller 30 becomes mixed lubrication of fluid lubrication and boundary lubrication during low speed rotation for pre-pressurizing operation, thereby greatly fluctuating the friction coefficient, increasing variation in the shaft torque to be measured, and aggravating the management accuracy for pre-pressure. In the case where Ra is 0.05 µm or more, the lubricating state becomes boundary lubrication, stabilizing the friction coefficient, so that accurate management of pre-pressure can be performed. In the case of rpms exceeding 100 rpm under normal bearing usage conditions, sufficient oil film is formed between the cone back face rib surface and the large end face 32, so that the lubricating state between these surfaces becomes fluid lubrication (perfect lubrication), thus reducing the friction coefficient.

The reason for setting the surface roughness Ra at 0.20 µm or less is that is if Ra exceeds 0.20 µm, when the bearing rises in temperature in the high speed rotation region, and the lubricating oil lowers in viscosity, the oil film thickness t becomes insufficient, tending to easily induce seizure.

The surface roughness Ra of the large end face of the tapered roller is preferably 0.02 µm or less. Employing such arrangement makes the surface roughness small relative to the oil film thickness and reduces the factor which inhibits oil film formation. More specifically, if the surface roughness is large relative to the oil film thickness, this results in metal contact, and if the surface roughness is small, metal contact will not occur, nor will be the oil film broken. In addition, improving the surface roughness more or less influences said pre-pressure management for low rotative speed but does not influence management accuracy so much.

The use of the tapered roller bearing of the second embodiment makes it possible, after forming a nitrogen rich layer, to obtain a breaking stress value superior than ever, providing superior anti-crack strength. Further, since the radius of curvature R of the large end face of the tapered roller has been set in the range of $R/R_{BASE}$=0.75-0.87, the carbonitrided layer in the part surface can be stably held in a material having a suitable degree of toughness, durability life with inclusion of foreign matter can be greatly improved, and torque loss and heat generation due to slide friction between the inner ring cone back face rib surface and tapered roller large end face can be reduced to prevent the occurrence of seizure. Further, since the end face deflection of the large end face of the tapered roller has been suppressed to 3 µm or less, the optimum oil film formation between the cone back face rib of the inner ring and the large end face of the tapered roller is stimulated and anti-seizurability and anti-pre-pressure escapability are improved. Pre-pressure escape, as is well-known, refers to a phenomenon in which pre-pressure gradually decreases due to friction or the like.

Heat treatments including carbonitriding to be applied to constituent parts of tapered roller bearing in the second embodiment will be described.

Figure 11:
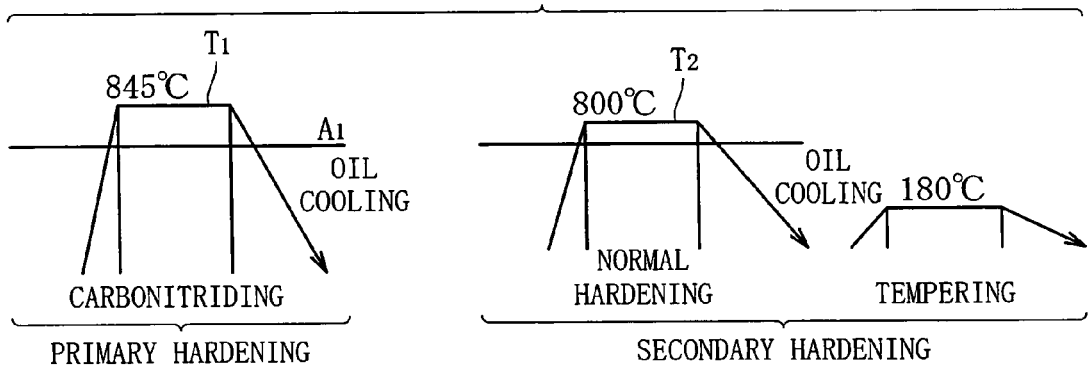
FIG. 11 is a diagram showing a heat treatment pattern in the embodiment of the invention.
Figure 12:
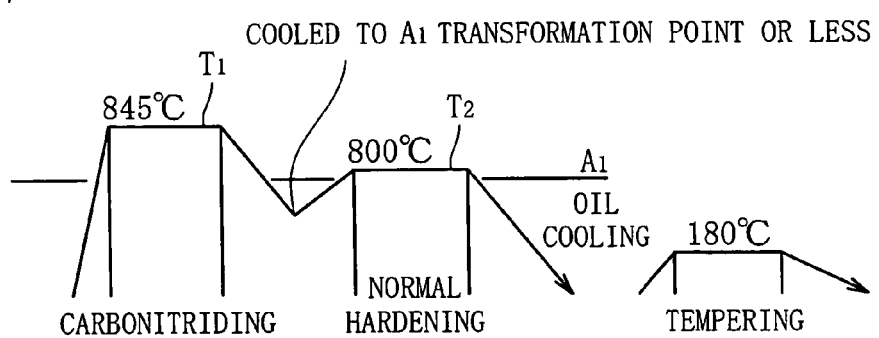
FIG. 12. is a diagram showing a heat treatment pattern in the embodiment of the invention.

FIGS. 11 and 12 show a heat treatment method in the second embodiment of the invention. FIG. 11 is a heat treatment pattern showing a method in which primary hardening and secondary hardening are performed. FIG. 12 is a heat treatment pattern showing a method in which a material is cooled to a temperature less than the $A_1$ transformation point temperature in the course of hardening and then it is reheated for final hardening. Both the examples of this embodiment of the invention.

Referring to FIG. 11, the steel of a bearing part is heated to a carbonitriding temperature (845°) exceeding the $A_1$ transformation point, and applied at this temperature to the steel of the bearing part is a carbonitriding treatment. At a treatment $T_1$, carbon and nitrogen is diffused into the basis metal of steel, with carbon sufficiently dissolved into the steel. Thereafter, the steel of the bearing part is subjected to oil hardening from the temperature for the treatment T1, whereupon it is cooled to a temperature less than the $A_1$ transformation point. Subsequently, it is subjected to tempering at 180°, which tempering may be omitted.

Thereafter, the steel of the bearing part is reheated to a temperature (for example, 800°) more than the $A_1$ transformation point but less than the temperature for said carbonitriding treatment and is subjected to a treatment $T_2$ as it is held at that temperature, whereupon it is oil-hardened from the temperature for the treatment $T_2$, and it is then cooled to a temperature less than the $A_1$ transformation point. Then, it is annealed at 180°.

The above heat treatment, rather than the normal hardening (carbonitriding treatment is followed by a single hardening) makes it possible to improve crack strength and to reduce secular dimensional change rate, while carbonitriding the surface layer. As described above, according to said heat treating method, it is possible to obtain a microstructure in which the grain diameter of austenite grains is reduced to not more than half the conventional value. The constituent part of the transmission having said heat treatment applied thereto has a long life for the fatigue life characteristics (the rolling fatigue characteristics if the constituent part is a rolling bearing or a rolling bearing part) and has an improved crack strength and a reduced secular dimensional change rate.

In either of the above heat treatments, a nitrogen rich layer, which is a "carbonitrided layer" is formed by the carbonitriding treatment included therein. Since the carbon concentration in the steel which is a raw material in the carbonitriding treatment is high, there are cases where carbon from the atmosphere of normal carbonitriding treatment hardly enters the surface of the steel. For example, in the case of a steel having a carbon content (a steel having about 1 wt %), there are cases where a carburized layer having a higher carbon concentration is formed or cases where a carburized layer having a higher carbon concentration is hardly formed. However, since nitrogen concentration, although depending on Cr concentration or the like, is as low as a maximum of 0.025 wt % for normal steel, a nitrogen rich layer is clearly formed regardless of the carbon concentration of the steel of raw material. It goes without saying that said nitrogen rich layer may have carbon enriched therein.

FIG. 12A shows austenite crystal grains in bearing steel having the heat treatment pattern shown in FIG. 11 applied thereto.

Figure 13A:
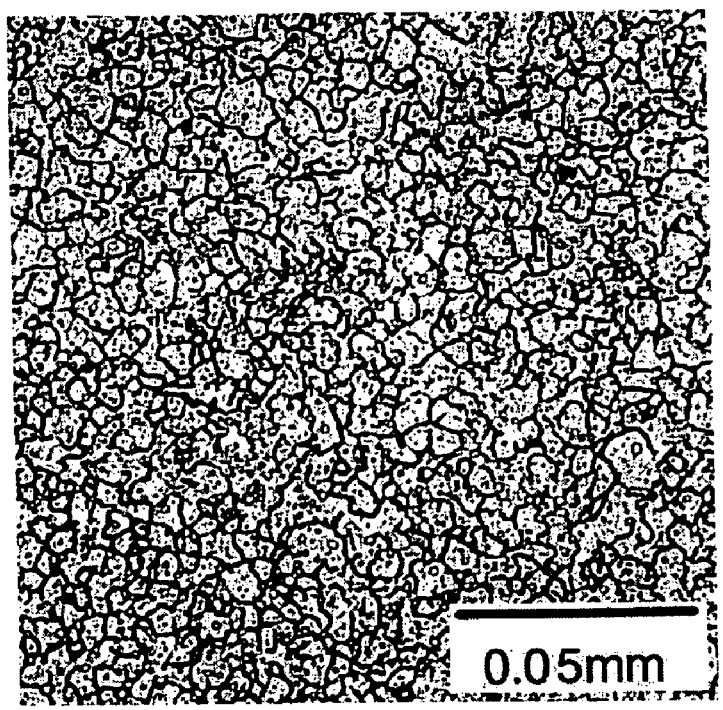
FIG. 13A is a view showing microstructure, particularly austenitic grains, of the steel in an example of the present invention.
Figure 13B:
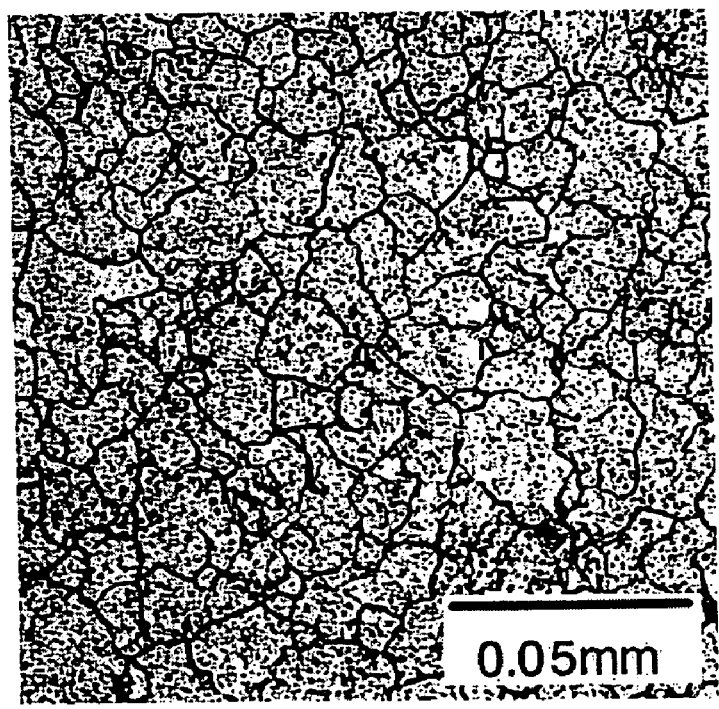
FIG. 13B is a view showing microstructure, particularly austenitic grains, of conventional steel.
Figure 14A:
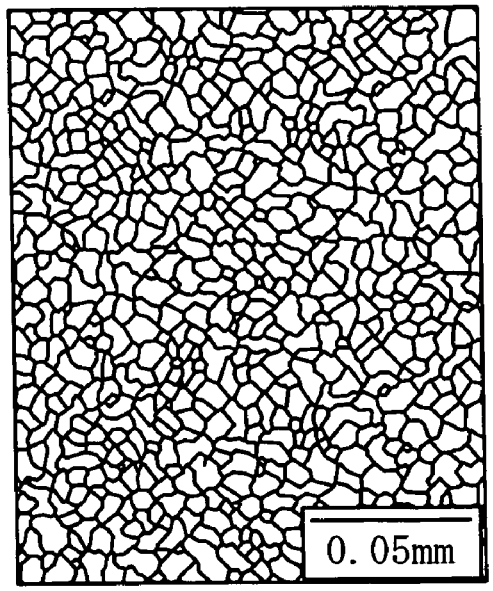
FIG. 14A is a schematic view of FIG. 13A.
Figure 14B:
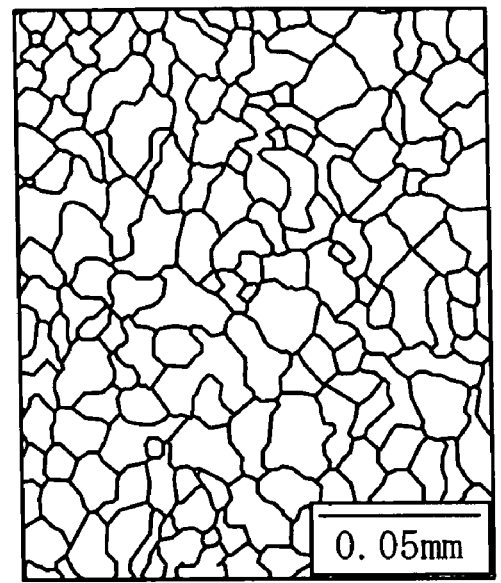
FIG. 14B is a schematic view of FIG. 13B.

For comparison purposes, austenite crystal grains in bearing steel treated by the conventional heat treating method are shown in FIG. 12B. FIGS. 13A and 13B diagrammatically show the structural views of FIGS. 12A and 12B. From these structural view showing austenite crystal grain size, the conventional austenite grain diameter is number 10 in terms of grain size number according to JIS (Japanese Industrial Standard), and fine grains of number 12 can be obtained by this heat treating method of the invention. Further, the mean grain diameter of FIG. 12A, as measured by the cutting method, was 5.6 µm.

Examples of the second embodiment will be described.

Example 1

Example 1 of the invention was made by using JIS SUJ2 Material (1.0 wt % C—0.25 wt % Si—0.4 wt % Mn—1.5 wt % Cr). Table 2 shows the production histories of the samples.

TABLE 2

| | Sample | | | | | | Conventional carbonitrided article | Normal hardened article |
|---|---|---|---|---|---|---|---|---|
| | A | B | C | D | E | F | | |
| Secondary hardening Temperature (□) | 780[1] | 800 | 815 | 830 | 850 | 870 | — | — |
| Hydrogen quantity (ppm) | — | 0.37 | 0.40 | 0.38 | 0.42 | 0.40 | 0.72 | 0.38 |
| Crystal grain size (JIS) | — | 12 | 11.5 | 11 | 10 | 10 | 10 | 10 |

TABLE 2-continued

| | Sample | | | | | | Conventional carbonitrided article | Normal hardened article |
|---|---|---|---|---|---|---|---|---|
| | A | B | C | D | E | F | | |
| Charpy impact value (J/cm²) | — | 6.65 | 6.40 | 6.30 | 6.20 | 6.30 | 5.33 | 6.70 |
| Breaking stress value (MPa) | — | 2840 | 2780 | 2650 | 2650 | 2700 | 2330 | 2770 |
| Rolling fatigue life Ratio ($L_{10}$) | — | 5.4 | 4.2 | 3.5 | 2.9 | 2.8 | 3.1 | 1 |

[1]This time, insufficient hardening made evaluation impossible.

Samples A-D

Inventive Examples

Carbonitriding treatment was performed: carbonitriding temperature, 850°, holding time, 150 minutes. The atmosphere at the time of carbonitriding treatment was a gas mixture of RX gas and ammonia gas. In the heat treatment pattern shown in FIG. 11, primary hardening was performed at a carbonitriding temperature of 850° and the samples were heated to a temperature range of 780°-830° which was lower than the carbonitriding temperature, so as to perform secondary hardening. However, the sample A heated to a secondary hardening temperature of 780° was excluded from the test because of its insufficient hardening.

Samples E and F

Inventive Examples

Carbonitriding treatment was performed with the same history as in the inventive examples A-D, and secondary hardening was performed at temperatures of 850°-870°, which were above the carbonitriding temperature (850°).

Conventional Carbonitrided Article

Comparative Example

Carbonitriding treatment was performed at 850° for a holding time of 150 minutes. The atmosphere at the time of carbonitriding treatment was a gas mixture of RX gas and ammonia gas. Hardening was performed at the carbonitriding temperature, with no secondary hardening.

Normally Hardened Article

Comparative Example

Hardening was performed by heating to 850°, without carbonitriding treatment. Secondary hardening was not performed.

Applied to each of the samples were (1) Measurement of Hydrogen quantity, (2) measurement of crystal grain size, (3) Charpy impact test, (4) measurement of breaking stress, and (5) rolling fatigue test. The results are shown in Table 1.

Next, these measuring methods and testing methods will be described.

(1) Measurement of Hydrogen Quantity

Hydrogen quantity was measured by DH-103 Model hydrogen analyzer made by LECO company. The non-diffusive hydrogen quantity in steel was measured. The diffusive hydrogen quantity was not measured. The specifications of this DH-103 Model hydrogen analyzer made by LECO company are shown below.

Analysis range: 0.01-50.00 ppm.

Analysis accuracy: ±0.1 ppm or ±3% H (the larger of the two).

Analysis sensitivity: 0.01 ppm.

Detection system: heat conductivity method.

Sample weight size: 10 mg-35 mg (maximum: 12 mm in diameter×100 mm in length).

Heating furnace temperature range: 50□-1100□.

Reagent: Anhydron ($Mg(ClO_4)_2$), Askalight NaOH.

Carrier gas: nitrogen gas, gas dosing gas (hydrogen gas), each gas having a purity of not less than 99.99 and a pressure of 40 PSI (2.8 kgf/cm²).

An outline of the measuring procedures is as follows. A sample taken by an exclusive sampler is put in said hydrogen analyzer, sampler by sampler. The diffusive hydrogen in the interior is led into a heat conductivity detector by the nitrogen carrier gas. This diffusive hydrogen is not measured in this embodiment. Next, the sample is taken out of the sampler and heated in a resistance heating furnace, and the non-diffusive hydrogen is led into the heat conductivity detector by the nitrogen carrier gas. In the heat conductivity detector, the heat conductivity is measured, whereby the non-diffusive hydrogen quantity can be found.

(2) Measurement of Crystal Grain Size

Crystal grain size was measured on the basis of the austenite crystal grain size measuring method for steel in JIS G 0551.

(3) Charpy Impact Test

Charpy impact tests were conducted on the basis of the Charpy impact testing method for metal materials in JIS Z 2242. The test piece used was a U-notched test piece (JIS No. 3 test piece) shown in JIS Z 2202. The Charpy impact test value is a value obtained by dividing the absorption energy E in the following formula by the cross sectional area (0.8 cm²).

Absorption energy: $E = WgR(\cos\beta - \cos\alpha)$.

W: hammer weight (=25.438 kg).

G: gravity acceleration (=9.80665)/sec$^2$).

R: distance from rotative shaft center to center of gravity (=0.6569 m).

α: hammer raise angle (=146°)

β: hammer fling-up angle (4) Measurement of Breaking Stress Value

Figure 15:
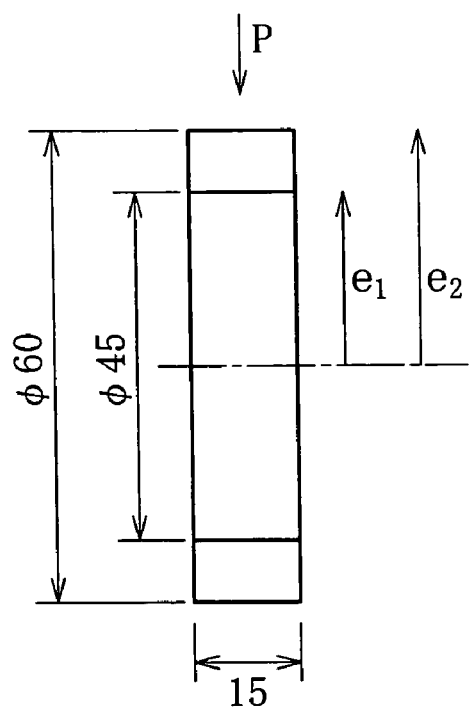
FIG. 15 is a sectional view of a test piece for static crush tests (measurement of crush stress)

FIG. 15 shows a test piece used for measuring breaking stress value. An Amsler universal testing machine is used and a load is applied in the P-direction in the figure and the loads are measured until break. Thereafter, the break load obtained is converted into a stress value by stress calculation formulas shown below for curved beams. In addition, the test piece is not limited to the one shown in FIG. 15, and test pieces of other shapes may be used.

Let $\sigma_1$ be the fiber stress in the convex surface of the test piece of FIG. 15, and $\sigma_2$ be the fiber stress in the concave surface thereof. Then, the $\sigma_1$ and $\sigma_2$ can be found by the following formulas (Mechanical Engineering Handbook A4 Part, Strength of Materials A 4-40). Here, N is the axial force in a section including the axis of an annular test piece, A is the cross sectional area, $e_1$ is the outer radius, and $e_2$ is the inner radius. Further, κ is the section modulus for curved beams.

$$\sigma_1 = (N/A) + \{M/(A\rho_0)\}[1 + e_1/\{\kappa(\rho_0 + e_1)\}]$$

$$\sigma_2 = (N/A) + \{M/(A\rho_0)\}[1 + e_2/\{\kappa(\rho_0 - e_2)\}]$$

$$\kappa = -(1/A)\int A\{\eta/(\rho_0 + \eta)\}dA$$

(5) Rolling Fatigue Test

Figure 16A:
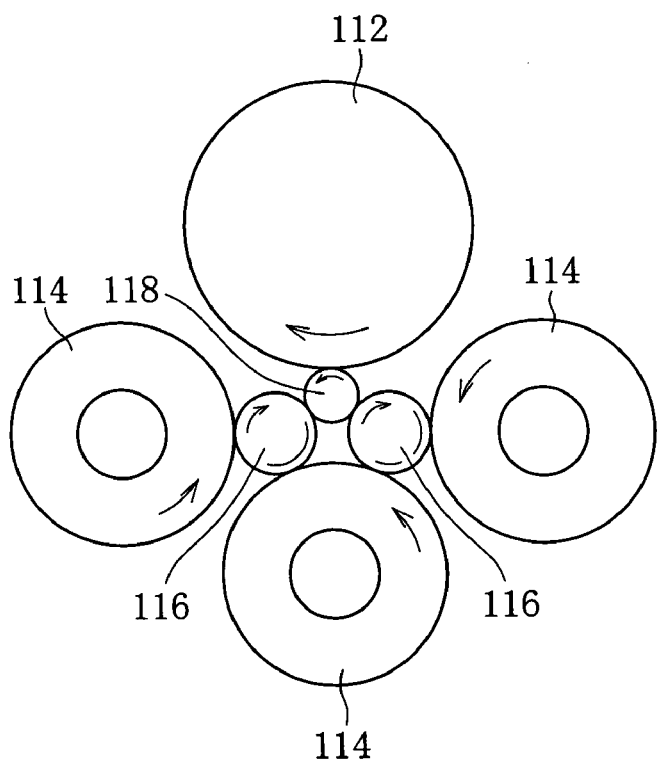
FIG. 16A is a schematic front view of a rolling fatigue life testing machine.
Figure 16B:
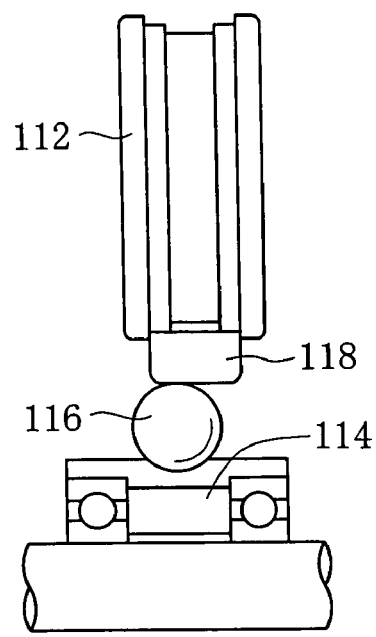
FIG. 16B is a schematic side view of the rolling fatigue life testing machine.

Test conditions and testing device for rolling fatigue life test are shown in Table 2 and FIGS. 16A and 16B. A rolling fatigue life test piece 118 is driven by a drive roll 112 and is rotating in contact with a ball 116. The ball 116, which is a ¾ inch ball, is guided by a guide roll 114, and rolls with a high surface pressure exerted between the ball and the rolling fatigue life test piece 118.

Next, the measurement results and test results will be explained.

(1) Hydrogen Quantity

It is seen from table 2 that the hydrogen quantity in the steel of the conventional carbonitrided article just after being carbonitrided has as high a value as 0.72 ppm. This is believed to be due to decomposition of ammonia ($NH_3$) contained in the carbonitriding atmosphere to cause the hydrogen to enter the steel. In contrast, in the samples B-F, the hydrogen quantity in the steel is 0.37-0.42 ppm, a reduction of about half of the value of the conventional carbonitrided article. This hydrogen quantity in the steel is on the same level as in the normally hardened article.

Said reduction of hydrogen quantity makes it possible to reduce brittleness of steel due to solid solution of hydrogen. That is, the reduction of hydrogen quantity has greatly improved the Charpy impact values and breaking stress values of the samples B-F of the inventive examples.

(2) Crystal Grain Size

It is seen from Table 1 that in the case where the secondary hardening temperature is lower than the temperature of hardening (primary hardening) during carbonitriding, that is, in the case of the samples B-D, crystal grains have been remarkably made finer to the extent that the crystal grain size number is 11-12. The austenite grains of the samples E and F and of the conventional carbonitrided article and normally hardened article have crystal grain size number 10, which shows that they are coarser than those of the samples B-D.

(3) Charpy Impact Test

According to Table 2, whereas the Charpy impact value of the conventional carbonitrided article is 5.33 J/cm$^2$, the Charpy impact values of the samples B-F in the inventive examples B-F are as high as 6.20-6.65 J/cm$^2$. Among these, those having lower secondary hardening temperatures tend to have higher Charpy impact values. In addition, the Charpy impact value of the normally hardened article is as high as 6.70 J/cm$^2$.

(4) Measurement of Breaking Stress Value

Said breaking stress value corresponds to anti-crack strength. According to Table 2, the conventional carbonitrided article has a breaking stress value of 2330 MPa. As compared with this, the breaking stress values of the samples B-F are improved, being 2650-2840 MPa. The breaking stress value of the normally hardened article is 2770 Mpa, being on the same level as the breaking stress values of the samples B-F. The improved anti-crack strength of the samples B-F is assumed to be largely due to not only the austenite crystal grains being made finer but also the reduction of hydrogen content.

(5) Rolling Fatigue Test

According to Table 2, reflecting the absence of a carbonitrided layer in the surface layer, the normally hardened article is the lowest in rolling fatigue life $L_{10}$. As compared with this, the rolling fatigue life of the conventional carbonitrided article is 3.1 times. The rolling fatigue life of the samples B-D is remarkably improved over the conventional carbonitrided article. The samples E and F are substantially equal in this value to the conventional carbonitrided article.

To summarize, the samples B-F in the inventive examples are reduced in hydrogen content in the steel, improving breaking stress, and Charpy impact value. However, it is the samples B-D, made finer in austenite crystal grain size to the extent of not less than number 11, that are capable of improving those including rolling fatigue life. Therefore, although what correspond to the inventive examples are samples B-F, more desirable range of the invention is the range of the samples B-D in which the secondary hardening temperature is made lower than the carbonitriding temperature to enhance size reduction of crystal grains.

Embodiment 2

A series of tests were conducted on the following A-material, B-material, and C-material. The material to be heat-treated was JIS SUJ2 Material (1.0 wt % C—0.25 wt % Si—0.4 wt % Mn—1.5 wt % Cr), being common to the A-material-C-material. The production history of each of the A-material-C-material is as follows.

A-material (comparative example): normal hardening alone was performed (no carbonitriding).

B-material (comparative example): hardening was performed just after carbonitriding (conventional carbonitriding hardening). Carbonitriding temperature was 845°, and holding time was 150 minutes. Further, the atmosphere for carbonitriding was RX gas+ammonia gas.

C-material (inventive example): a bearing steel having the heat treatment pattern of FIG. 12 applied thereto. Carbonitriding temperature was 845° and holding time was 150 minutes. The atmosphere was RX gas+ammonia gas. Further, the final hardening temperature was 800□.

(1) Rolling Fatigue Life

The test conditions and testing device for rolling fatigue life are as shown in FIG. 16A and FIG. 16B, as described above. The testing conditions are as shown in Table 3. The results of the rolling fatigue life tests are shown in Table 4.

TABLE 3

| Test piece | φ2 × L22 cylindrical test piece |
|---|---|
| Number of tests | 10 |
| Mating steel ball | ¾ in (19.05 mm) |
| Contact surface pressure | 5.88 GPa |
| Loading speed | 46240 cpm |
| Lubricating oil | Turbine VG68 forced circulation oiling |

TABLE 4

| | Life (number of times of loading) | | |
|---|---|---|---|
| Material | $L_{10}$ (×10$^4$) | $L_{10}$ (×10$^4$) | $L_{10}$ ratio |
| A-material | 8017 | 18648 | 1.0 |
| B-material | 24656 | 33974 | 3.1 |
| C-material | 43244 | 69031 | 5.4 |

According to Table 4, the B-material (comparative example) carbonitrided shows 3.1 times the $L_{10}$ life (the life such that one out of every ten test pieces breaks) of the A-material (comparative example) subjected to normal hardening alone, exhibiting the long life effect due to carbonitriding. In contrast, the C-material of the inventive example shows as long a life as 1.74 times that of the B-material and 5.4 times that of the A-material. The main factor for this improvement is believed to be due to microstructure being made finer.

(2) Charpy Impact Test

Charpy impact tests were conducted using U-notched test pieces by a method similar to said JIS Z 2242. The test results are shown in Table 5.

TABLE 5

| Material | Charpy impact value (J/cm$^2$) | Impact value ratio |
|---|---|---|
| A-material | 6.7 | 1.0 |
| B-material | 5.3 | 0.8 |
| C-material | 6.7 | 1.0 |

The C-material of the inventive example is equal in Charpy impact value to normal hardening alone and is higher in said value than the B-material (comparative example) subjected to carbonitriding treatment.

(3) Test for Static Fracture Toughness Value

Figure 17:
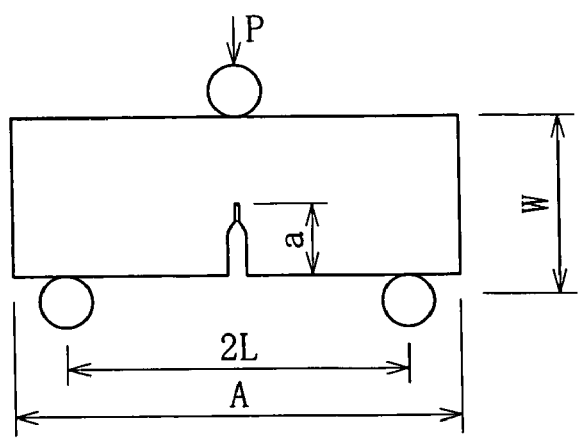
FIG. 17 is a view showing a test procedure for static fracture toughness tests.

A test piece shown in FIG. 17 was used as a test piece for static fracture toughness test. An about 1 mm crack fissure was introduced in advance and then a static load P based on 3-point bending was applied thereto to find the breaking load. For calculation of the fracture toughness value ($K_{1C}$), use was made of the following formula. Further, the test results are shown in Table 6.

$$K_{IC}=(PL\sqrt{a}/BW^2)\{5.8-9.2(a/W)+43.6(a/W)^2-75.3(a/W)^3+77.5(a/W)^4\}.$$

TABLE 6

| Material | The number of tests | $K_{IC}$ (MPa√m) | $K_{IC}$ ratio |
|---|---|---|---|
| A-material | 3 | 16.3 | 1.0 |
| B-material | 3 | 16.1 | 1.0 |
| C-material | 3 | 18.9 | 1.2 |

Because the crack fissure depth introduced in advance has become greater than the carbonitrided layer depth, there is no difference between the A-material and B-material of the comparative examples. However, it is possible for the C-material of the inventive example to obtain about 1.2 times the fracture toughness value ($K_{IC}$ value) of the A-material and B-material of comparative examples.

(4) Static Crush Strength Test (Measurement of Breaking Stress)

The static crush test piece used had a shape like one shown in FIG. 15, as described above. In the figure, a load was applied in the P-direction to conduct static crush strength tests in the same manner as described above. The results of the tests are shown in Table 7.

TABLE 7

| Material | The number of tests | Static crush strength (kgf) | Static crush strength ratio |
|---|---|---|---|
| A-material | 3 | 4200 | 1.00 |
| B-material | 3 | 3500 | 0.84 |
| C-material | 3 | 4300 | 1.03 |

The B-material (comparative example) subjected to carbonitriding shows a value somewhat lower than that of the A-material subjected to normal hardening alone. However, the C-material of the inventive example has improved in static crush strength over the B-material and a level which is a little higher than that of A-material has been obtained.

(5) Secular Dimensional Change Rate

Secular dimensional change rate at a holding temperature of 130° with a holding time of 500 hours is measured. The measurement results are shown in Table 8 together with surface hardness, and retained austenite quantity (at a depth of 0.1 mm from the surface).

TABLE 8

| Material | The number of tests | Surface hardness (HRC) | Retained γ quantity (vol %) | Dimensional change rate (×10$^{-6}$) | Dimensional change rate ratio*) |
|---|---|---|---|---|---|
| A-material | 3 | 62.5 | 9.0 | 18 | 1.0 |
| B-material | 3 | 63.6 | 28.0 | 35 | 1.9 |
| C-material | 3 | 60.0 | 11.3 | 22 | 1.2 |

*)the smaller, the superior.

It is seen that as compared with the dimensional change rate of the B-material having much retained austenite quantity, that of the C-material of the inventive example is suppressed to be low.

(6) Life Test with Lubricant Having Foreign Matter Mixed Therein

A ball bearing 6206 was used and an evaluation was made of the rolling fatigue life with inclusion of a predetermined amount of foreign matter. The test conditions are shown in Table 9 and test results are shown in Table 10.

TABLE 9

| | |
|---|---|
| Load | Fr = 6.86 kN |
| Contact surface pressure | Pmax = 3.2 GPa |
| Rotative speed | 2000 rpm |
| Lubrication | Turbine 56 bath lubrication |
| Foreign matter quantity | 0.4 g/1000 cc |
| Foreign matter | Grain size 100-180 µm, hardness Hv 800 |

TABLE 10

| Material | $L_{10}$ life (h) | L10 life ratio |
|---|---|---|
| A-material | 20.0 | 1.0 |
| B-material | 50.2 | 2.5 |
| C-material | 74.0 | 3.7 |

As compared with the A-material, a long life of about 2.5 time for the B-material subjected to carbonitriding treatment has been obtained and so has been a long life of about 3.7 times for the C-material of the inventive example. The C-material of the inventive example, though containing less retained austenite than the B-material of comparative example, has obtained a long life due to entry of nitrogen and the effect of microstructure being finer.

It is seen from the above results that the C-material, that is, a bearing part forming the support structure in a transmission produced by the heat treating method of the invention, can simultaneously satisfy the three items, prolongation of rolling fatigue life, improvement in crack strength, and reduction of secular dimensional change rate, which have been difficult to attain by conventional carbonitriding treatment.

In addition, the austenite crystal grains mentioned in the specification refers to the austenite crystal grains which have phase-transformed during heating for hardening and which have remained as the history of the past even after transformation into martensite by cooling.

Third Embodiment

Next, a third embodiment of the invention corresponding to a modification of the second embodiment will be described.

A tapered roller bearing according to the their embodiment comprises an inner ring having a conical surface-like raceway in its outer periphery and formed with a cone back face rib and a cone front face rib on opposite sides of the raceway, an outer ring having a conical surface-like raceway in its inner periphery, a plurality of tapered rollers interposed between the raceways of the inner and outer rings, and a cage for holding the tapered rollers at predetermined circumferential intervals, wherein at least one of the constituent parts, the inner ring, outer ring, and tapered rollers, has a nitrogen rich layer in its surface layer, the grain size number of the austenite crystal grains in said nitrogen rich layer exceeds number 10, the opposite ends of the raceway surface of said inner ring are crowned, the width of the crown at each end being 20% or less of the raceway surface width of the inner ring, the ratio $R/R_{BASE}$ of the radius of curvature R of the large end face of the tapered roller to the distance $R_{BASE}$ from the apex of cone of the tapered roller to the cone back face rib surface of the inner ring is set at 0.75 to 0.87, and the end deflection of the large end face of the tapered roller is 3 µm or less.

The reason for forming crowns at the opposite ends of the raceway surface of the inner ring is to prevent occurrence of excessively large edge load on the roller and on the raceway surface of the inner ring. The reason for limiting the width of the crowns to 20% or less of the raceway surface width of the inner ring is because if it exceeds 20%, the contact surface pressure in the raceway surface middle becomes excessively large.

The use of the tapered roller bearing of the third embodiment, after forming a nitrogen rich layer, makes it possible to obtain a breaking stress value superior than ever, providing superior anti-crack strength. Further, it is possible to form edge crowns, whose width is 20% or less of the raceway surface, on the opposite ends of the raceway surface, to uniform the contact surface pressure on the raceway surface so as to prevent seizure, to stably hold a carbonitrided layer on a part surface, in a material having a suitable degree of roughness, and to remarkably improve durability life with inclusion of foreign matter.

The region of said inner ring raceway surface excluding the opposite ends formed with the crowns may be formed with a crown having a gentle curvature. Employing such arrangement makes it possible to uniform surface pressure distribution on the raceway surface.

Figure 18:
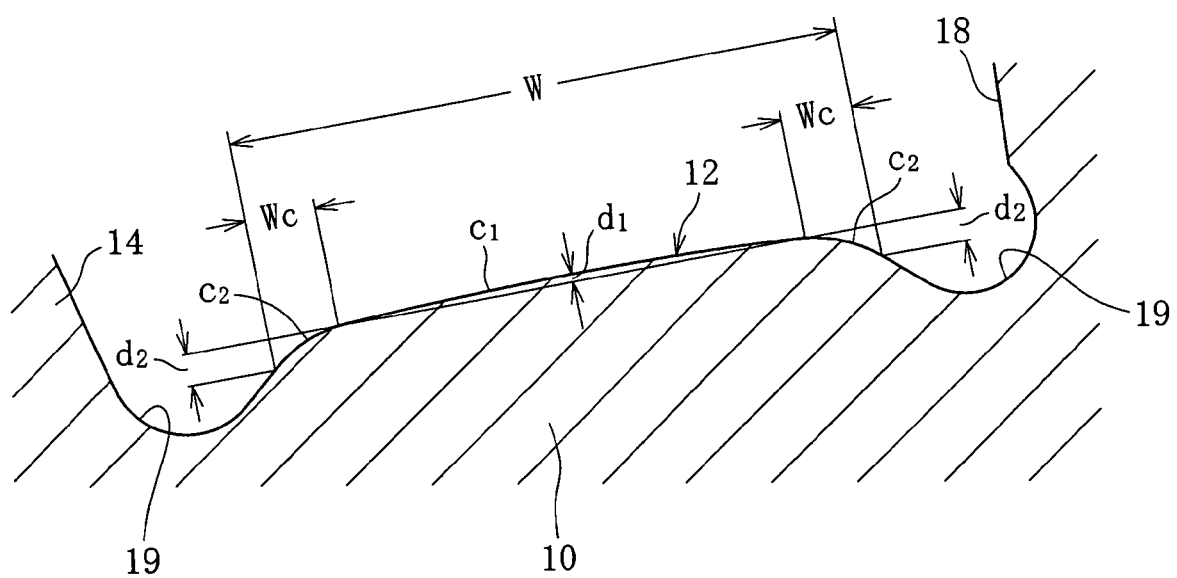
FIG. 18 is an enlarged view of the raceway of the inner ring in the tapered roller bearing of FIG. 1.

Referring to FIG. 18, the opposite ends of the raceway surface 12 of the inner ring 10 are formed with edge crowns $C_2$ whose width Wc is 20% or less of the width W of the raceway surface 12, and a center crown $C_1$ of very gentle curvature is formed in the middle between these crowns $C_2$. In addition, the drop quantity $d_2$ of the crown $C_2$ is 20 µm and reliefs 19 are formed in the outer sides of the crown $C_2$.

The breaking stress for the constituent part is preferably 2650 Mpa or more. We have found that the breaking stress for the steel having a nitrogen rich layer can be given 2650 Mpa or more, a value heretofore been impossible to attain, by carbonitriding the steel at carbonitriding temperatures exceeding $A_1$ transformation point, cooling it to a temperature below the A1 transformation point, reheating it to a hardening temperature region above the $A_1$ transformation point, and hardening it. Thereby, a tapered roller bearing can be obtained which, as compared with the prior art, is superior in breaking stress and hence is high in strength.

The hydrogen content of said constituent part is preferably 0.5 ppm or less. Thereby, brittleness of steel due to hydrogen can be reduced. When the hydrogen content of the steel exceeds 0.5 ppm, the crack strength of steel lowers. Therefore, such steel is not suitable for use in a hub support structure subjected to severe loads. It is desirable that hydrogen content be low. However, it takes a long time of heating to reduce it to less than 0.3 ppm, leading to the coarsening of austenite grains, and on the contrary, toughness lowers. Therefore, desirable hydrogen content is in the range of 0.3-0.5 ppm. More desirably, it is in the range of 0.35-0.45 ppm.

In addition, as to the above hydrogen content, diffusible hydrogen is not a subject of measurement, while non-diffusible hydrogen alone discharged from the steel at a predetermined temperature or more is taken up as a subject of measurement. If the sample size is small, the hydrogen is discharged even at normal temperature and lost as it scatters; therefore, the diffusible hydrogen quantity is dropped from the subject of measurement. Non-diffusible hydrogen is trapped in the defects of steel; it is discharged only at above a predetermined temperature from the sample and lost as it scatters. Even if restricted to said non-diffusible hydrogen, the hydrogen content varies widely according to measuring methods. Said hydrogen content range is a range according to a measuring method using thermal conductimetry. Further, as will be later described, it is desirable to make measurements by using DH-103 Model hydrogen analyzer made by LECO company or other measuring instrument similar thereto.

The surface roughness Ra of the large end face of the tapered roller is preferably 0.02 μm or less. Employing such arrangement reduces the surface roughness for the oil film thickness and the factor which inhibits oil film formation. More specifically, if the surface roughness is large relative to the oil film thickness, this results in metal contact, whereas if it is small, metal contact never occurs, not breaking oil films. In addition, improving the surface roughness more or less influences said pre-pressure management for low rotative speed but does not influence management accuracy so much.

Fourth Embodiment

Next, a fourth embodiment of the invention corresponding to a modification of the second embodiment will be described.

Tapered roller bearings are bearings suitable for being loaded with radial load and axial load and combined load consisting thereof and have a large load capacity. Therefore, in power transmission devices such as differentials and transmissions of vehicles such as automobiles and construction machines, use is made of support devices which support gear shafts by tapered roller bearings.

Figure 19:
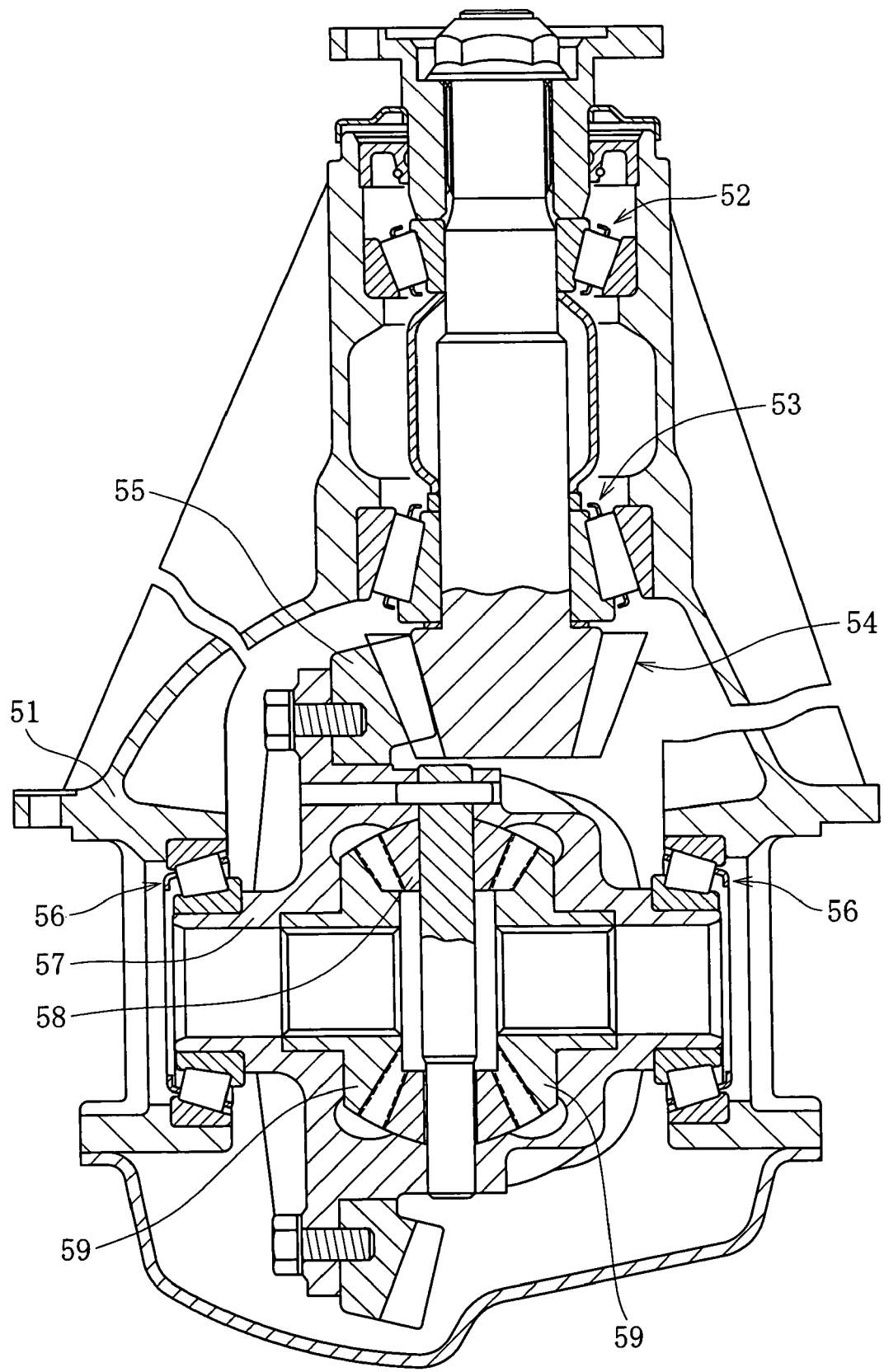
FIG. 19 is a longitudinal sectional view of a differential.

FIG. 19 shows a differential for automobiles. This differential gear is composed basically of a drive pinion 54 rotatably supported by two tapered roller bearings 52 and 53 in a housing 51, a ring gear 55 meshing with said drive pinion 54, a differential gear case 57 having said ring gear 55 attached thereto and rotatably supported by a pair of tapered roller bearings 56 in the housing 51, a pinion 58 disposed in said differential gear case 57, and a pair of side gears 59 meshing with the pinion 58, these components being received in the housing 51 having gear oil sealed therein. Said gear oil also serves as lubricating oil for the tapered roller gearings 52, 53 and 56.

The power transmission devices, such as the differential described above have so many regions where gears mesh and regions where rotative members slide that foreign matters such as metal abrasion powders mixed in the gear oil sealed in the housing. These abrasion powders enter the tapered roller bearings supporting the gear shaft rotating with high load, sometimes becoming a problem from the standpoint of durability life.

Further, since tapered roller bearings, as described above, are designed so that the large end face of the tapered roller makes slide contact with the cone back face rib surface of the inner ring. Therefore, if they are used for supporting the gear shafts of differential or the like rotating at high speeds and with high loads, the friction torque due to the slide friction becomes larger, and the bearings rise in temperature due to friction heat generation to lower the viscosity of the gear oil serving as lubricating oil, sometimes causing a problem due to oil film shortage.

Accordingly, the problem of the fourth embodiment is to provide a tapered roller bearing capable of securing a long durability life even with inclusion of foreign matter and causing little torque loss and heat generation due to friction.

The tapered roller bearing of the fourth embodiment comprises an inner ring having a conical surface-like raceway in its outer periphery and formed with a cone back face rib and a cone front face rib on opposite sides of the raceway, an outer ring having a conical surface-like raceway in its inner periphery, a plurality of tapered rollers interposed between the raceways of the inner and outer rings, and a cage for holding the tapered rollers at predetermined circumferential intervals, wherein said inner ring, outer ring, and tapered rollers are each formed on its surface with a carbonitrided layer having a carbon content of 0.80 wt % or more and a Lockwell hardness HRC of 58 or more; the ratio $R/R_{BASE}$ of the radius of curvature R of the large end face of the tapered roller to the distance $R_{BASE}$ from the apex of cone of the tapered roller to the cone back face rib surface of the inner ring is set at 0.75 to 0.87; and the end face deflection of the large end face of the tapered roller is 3 μm or less.

The reason for forming the surfaces of the inner ring, outer ring, and tapered rollers with a carbonitrided layer is as follows. The retained austenite in the carburized layer obtained by normal carburization hardening has high toughness and work-hardening property. Allowing the work to include this feature to a suitable degree ensures that after the hardness of the carburized layer is secured, generation and growth of cracks is suppressed, with a disadvantage of being unstable to heat. On the other hand, if a nitriding treatment is made under suitable conditions, nitrogen atoms solid-dissolve into the retained austenite, playing a role in making the latter stable against heat, making it possible to properly hold the material of the carbonitrided layer against temperature rise due to heat generation in the bearing. Since the carbonitrided layer obtained by the nitriding treatment is formed with residual stress of compression larger than that in the normal carburized layer, fatigue strength can be further enhanced.

The structure of said carbonitrided layer can be formed by the following heat treating process. That is, the carbon potential in the carburization atmosphere is set at 0.8% or more and heated and held for a predetermined time, then followed by cooling in oil and nitridation hardening. Thereafter, the work is heated and held in ammonia gas for a predetermined time and nitrided. A method may be selected in which nitriding treatment is simultaneously performed during carburizing process.

Thus, in the tapered roller bearing of the fourth embodiment, the surfaces of the inner ring, outer ring, and tapered roller are formed each with a carbonitrided layer having a carbon content of 0.80 wt % or more and a Lockwell hardness HRC of 58 or more, and the radius of curvature R of the large end face of the tapered roller is set in the range of $R/R_{BASE}$=0.75-0.87. Therefore, the carbonitrided layer in the part surface can be stably held in a material having a suitable degree of toughness, durability life with inclusion of foreign matter can be greatly improved, and torque loss and heat generation due to slide friction between the inner ring cone back face rib surface and tapered roller large end face can be reduced to prevent the occurrence of seizure. Further, since the end face deflection of the large end face of the tapered roller has been suppressed to 3 μm or less, the optimum oil film formation between the cone back face rib of the inner ring and the large end face of the tapered roller is stimulated and anti-seizurability and anti-pre-pressure escapability are improved. Pre-pressure escape, as is well-known, refers to a phenomenon in which pre-pressure gradually decreases due to friction or the like.

The surface roughness Ra of the cone back face rib surface of the inner ring is preferably in the range of 0.05-0.20 μm. Employing such arrangement makes it possible, because of the relationship of the oil film thickness t between the cone back face rib surface of the inner ring and the large end face of the tapered roller, to properly hold the lubrication state between these surfaces.

The surface roughness of the large end face of the tapered roller is preferably 0.02 μm. Employing such arrangement reduces the surface roughness relative to the oil film thickness, thus reducing the factor which inhibits oil film formation. More specifically, if the surface roughness is large relative to the oil film thickness, this results in metal contact, whereas if it is small, metal contact never occurs, not breaking oil films. In addition, improving the surface roughness of the large end face of the tapered roller more or less influences said pre-pressure management for low rotative speed but does not influence pre-pressure management accuracy so much.

Figure 20:
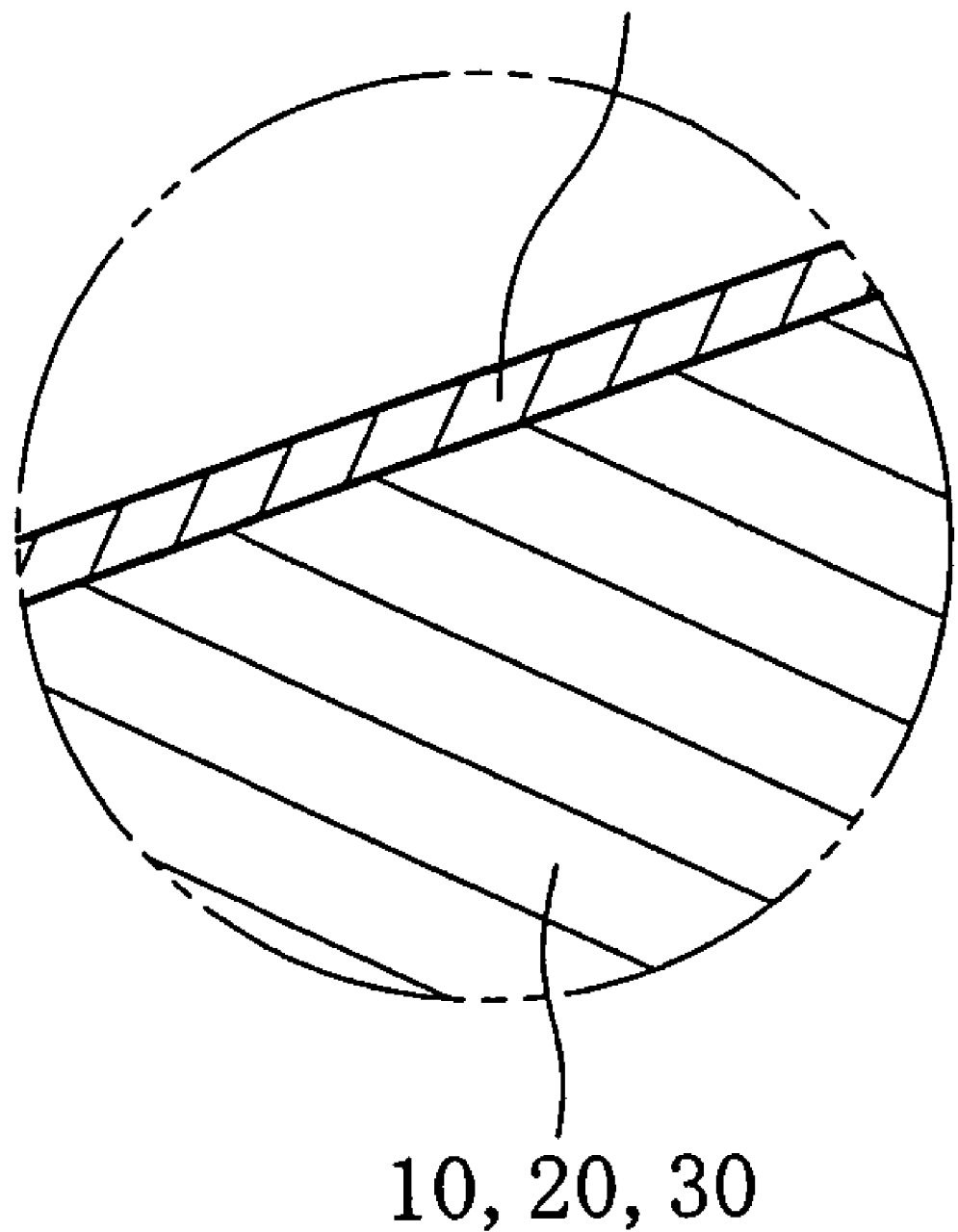
FIG. 20 is a principal enlarged sectional view of the tapered roller bearing of FIG. 1.

Each of the parts, the inner ring 10, outer ring 20, and tapered rollers 30, is formed of carburized bearing steel SCr435. The surfaces of these parts, as shown in FIG. 20, are formed with carbonitrided layers 10a, 20a, and 30a having a carbon content of 0.80 wt % or more and a Lockwell hardness HRC of 58 or more. In this embodiment, use is made of SCr435 as raw material for said parts, besides which, however, bearing steels, such as SCM430, SCM435, SCr430, SCr420, SCM420, SAE5130, and SAE8620 may be used.

Inventive examples and comparative examples will be given below.

Inventive Examples

Tapered roller bearings (inventive examples 1-4, in Table 11) were prepared in which the surface of each of the parts, the inner ring 10, outer ring 20, and tapered rollers 30, made of carburized bearing steel SCr435, was formed, as shown in FIGS. 1 and 20, with a carbonitrided layer having a carbon content of 0.80 wt % or more and a Lockwell hardness HRC of 58 or more, the radius of curvature R of the large end face 32 of the tapered roller 30 was in the range of $0.75 \leq R/R_{BASE} \leq 0.87$, the end face deflection of the large end face 32 of the tapered roller was 1 μm, the surface roughness Ra of the cone back face rib surface 18 of the inner ring 10 was 0.12 μm. Each bearing size is such that the inner diameter is 40 mm and the outer diameter is 68 mm.

Comparative Examples

Tapered roller bearings (comparative examples 1-3, in Table 11) were prepared in which the surface of each of the parts, the inner ring, outer ring, and tapered rollers, made of carburized bearing steel SCr435, was formed, as in the inventive examples, with a carbonitrided layer having a carbon content of 0.80 wt % or more and a Lockwell hardness HRC of 58 or more, and the $R/R_{BASE}$ was outside the range of the invention ($0.75 \leq R/R_{BASE} \leq 0.87$), and also prepared was a tapered roller bearing (comparative example 4, in Table 11) in which the heat treatment was normal carburization hardening alone and the $R/R_{BASE}$ was also outside the range of the invention. Each bearing size is the same as in the inventive examples.

The tapered roller bearings of the above-mentioned inventive and comparative examples were subjected to a foreign matter mixed-in life test in which the bearing was attached to a rotative shaft in an oil bath having foreign matter mixed therein, and an anti-seizure test using a rotation testing machine. The test conditions are as follows.

(Foreign Matter Mixed-In Life Tests)

Load: 11.76 kN.

Number of revolutions: 1500 rpm.

Lubricating oil: Turbine VG56 (oil bath).

Foreign matter: gas-atomize metal powder (particle diameter 10-180, hardness HV 700-800, mixed-in quantity: 1 g/liter).

(Anti-Seizure Tests)

Load: 19.61 kN.

Number of revolutions: 1000-3500 rpm.

Lubricating oil: Turbine VG56 (oil feed rate, 40 milliliter/min, oil feed temperature, 40±3).

The test results are shown in Table 11. The durability life in the foreign matter mixed-in life tests was evaluated in terms of $L_{10}$ life (hours for which 90% of the bearings are usable without being broken). The life ratio was determined with the durability life of the comparative example 4 used as a reference. Further, the seizure in the anti-seizure tests was the seizure which occurred between the cone back face rib surface of the inner ring and the large end face of the tapered roller.

TABLE 11

| Test bearing | Heat treatment | Radius of curvature $R/R_{BASE}$ | Surface roughness Ra (μm) | Foreign matter mix-in life test Durability life (hr) | Life ratio | Seizure occurrence limit number of revolutions (rpm) in anti-seizure test |
|---|---|---|---|---|---|---|
| Inventive example 1 | Carbonitriding | 0.75 | 0.12 | 150 | 5.4 | 2700 |
| Inventive example 2 | Carbonitriding | 0.80 | 0.12 | 159 | 5.7 | 3500 |
| Inventive example 3 | Carbonitriding | 0.85 | 0.12 | 155 | 5.5 | 3000 |
| Inventive example 4 | Carbonitriding | 0.87 | 0.12 | 135 | 4.8 | 2700 |
| Comparative example 1 | Carbonitriding | 0.70 | 0.12 | 154 | 5.5 | 2200 |
| Comparative example 2 | Carbonitriding | 0.94 | 0.12 | 140 | 5.0 | 2500 |
| Comparative example 3 | Carbonitriding | 0.94 | 0.25 | 122 | 4.4 | 2200 |
| Comparative example 4 | Carburizing | 0.94 | 0.25 | 28 | 1.0 | 2000 |

It is seen that the tapered roller bearings of the inventive examples each show a superior durability life in which the life ratio in the foreign matter mixed-in life test is four times or more and that the seizure occurrence limit number of revolutions in the anti-seizure test is 2700 rpm or more. On the other hand, the comparative examples 1-3 in which although a carbonitrided layer is formed, the $R/R_{BASE}$ is outside the range of the invention are superior in life ratio but they have a high possibility that seizure occurs when the seizure occurrence limit number of revolutions is 2500 rpm or less. The comparative example 3 in which the surface roughness Ra of the cone back face rib surface is high shows a seizure occurrence limit number of revolutions which is lower than in the comparative example 2 having the same radium of curvature. The comparative example 4 in which the heat treatment is normal carburization hardening alone and the $R/R_{BASE}$ is the same as the prior value is inferior in each of the test results.

Fifth Embodiment

Next, a fifth embodiment of the invention corresponding to a modification of the above-mentioned fourth embodiment will be described.

The tapered roller bearing of the fifth embodiment comprises an inner ring having a conical surface-like raceway in its outer periphery and formed with a cone back face rib and a cone front face rib on opposite sides of the raceway, an outer ring having a conical surface-like raceway in its inner periphery, a plurality of tapered rollers interposed between the raceways of the inner and outer rings, and a cage for holding the tapered rollers at predetermined circumferential intervals, wherein said inner ring, outer ring, and tapered rollers are each formed on its surface with a carbonitrided layer having a carbon content of 0.80 wt % or more and a Lockwell hardness HRC of 58 or more; the retained austenite quantity in the carbonitrided layer is 25-35 wt %; the opposite ends of the raceway surface of the inner ring are crowned; the width of the crown at each end is 20% or less of the raceway surface width of the inner ring; the ratio $R/R_{BASE}$ of the radius of curvature R of the large end face of the tapered roller to the distance $R_{BASE}$ from the apex of cone of the tapered roller to the cone back face rib surface of the inner ring is set at 0.75 to 0.87; and the end face deflection of the large end face of the tapered roller is 3 μm or less.

The reason for setting the retained austenite quantity at 25-35 vol % is to impart a suitable degree of toughness to the carbonitrided layer and to mitigate excessive increase□ in stress due to bite-in of foreign matter. That is, if the retained austenite quantity is less than 25 vol %, this results in shortage of toughness, while if it exceeds 35 vol %, this results in the excessive lowering of hardness, leading to aggravation of surface roughness.

The structure of the above-mentioned carbonitrided layer can be formed the treating process which follows. That is, the work is heated for a predetermined time with the carbon potential in the carburizing atmosphere being held at 0.8% or more and then it is cooled in oil, held in heated state for a predetermined time, and nitriding is effected. A method may also be employed in which nitriding is effected during carburizing. In addition, in order to adjust the retained austenite quantity, subzero treatment or tempering may be performed.

The reason for forming crowns at the opposite ends of the raceway surface of the inner ring is to prevent occurrence of excessive edge load in the rollers and in the raceway surface of the inner ring. The reason for setting the width of these crowns at 20% or less of the raceway surface width of the inner ring is that if it exceeds 20%, the contact surface pressure in the raceway surface middle will become excessively large.

The region of said inner ring raceway surface excluding the opposite ends formed with the crowns may be formed with a crown having a gentle curvature. Employing such arrangement makes it possible to uniform surface pressure distribution on the raceway surface.

The surface roughness of the large end face of the tapered roller should preferably be 0.02 μm Ra or less. Employing such arrangement ensures that the surface roughness is reduced relative to the oil film thickness, reducing the factor which inhibits oil film formation. More specifically, if the surface roughness is large relative to the oil film thickness, this will result in metal contact, whereas if it is small, metal contact never occurs, not breaking oil films.

Thus, in the tapered roller bearing of the fifth embodiment, the surface of each of the parts, the inner ring, outer ring, and tapered rollers, is formed with a carbonitrided layer having a carbon content of 0.80 wt % or more and a Lockwell hardness HRC of 58 or more, said carbonitrided layer retained austenite whose amount is 25-35 wt %, and the opposite ends of the inner ring raceway surface are formed with edge crowns whose width is 20% or less of the width of the raceway surface, thereby making it possible to uniform the contact pressure on the raceway surface so as to prevent seizure, to stably hold a carbonitrided layer on a part surface, in a material having a suitable degree of roughness, and to remarkably improve durability life with inclusion of foreign matter. Further, since the ratio $R/R_{BASE}$ of the radius of curvature R of the large end face of the tapered roller to the distance $R_{BASE}$ from the apex of cone of the tapered roller to the cone back face rib surface of the inner ring is set at 0.75 to 0.87 and since the end deflection of the large end face of the tapered roller is suppressed to 3 μm or less, the optimum oil film formation between the cone back face rib of the inner ring and the large end face of the tapered roller is stimulated and anti-seizurability and anti-pre-pressure escapability are improved. Pre-pressure escape, as is well-known, refers to a phenomenon in which pre-pressure gradually decreases due to friction or the like.

Each of the parts, the inner ring 10, outer ring 20, and tapered rollers 30, is formed of carburized bearing steel SCr435. The surfaces of these parts, as shown in FIG. 20, are formed with carbonitrided layers 10a, 20a, and 30a having a carbon content of 0.80 wt % or more, a Lockwell hardness HRC of 58 or more, and 25-35 vol % retained austenite. In addition, in this embodiment, use is made of SCr435 as raw material for said parts, besides which, however, bearing steels, such as SCM420, SCM430, SCM435, SCr420, SCr430, SAE5130, and SAE8620 may be used.

Further, as shown in FIG. 18, the opposite ends of the raceway surface 12 of the inner ring 10 are formed with edge crowns $C_2$ whose width Wc is 20% or less of the width W of the raceway surface 12, and a center crown $C_1$ of very gentle curvature is formed in the middle between these crowns $C_2$. In addition, the drop quantity $d_2$ of the crown $C_2$ is 20 μm, and reliefs 19 are formed in the outer sides of the crown $C_2$.

Inventive Examples

Tapered roller bearings (inventive examples 5-9, in Table 12) were prepared in which the surface of each of the parts, the outer ring, inner ring, and tapered rollers, made of carburized bearing steel SCr435, were formed, as shown in FIGS. 1 and 20, with a carbonitrided layer having a carbon content of 0.80 wt % or more, a Lockwell hardness HRC of 58 or more, and 25-35 vol % retained austenite, and in which, as shown in FIG. 4, the opposite ends of the inner ring raceway surface 12 were formed with edge crowns $C_2$ whose width Wc was 20% or less of the width W. In addition, in the tapered roller bearings of the inventive examples 5 through 7, a center crown $C_1$ having a crown quantity $d_1$ of 2 μm was formed in the middle inner ring raceway surface 12. In the tapered roller bearings of the inventive examples 8 and 9, no center drown was formed. Each bearing size is such that the inner diameter is 40 mm and the outer diameter is 68 mm.

Comparative Examples

Tapered roller bearings (comparative examples 5-8, in Table 12) were prepared in which the surface of each of the parts, the inner ring, outer ring, and tapered rollers, made of carburized bearing steel SCr435, were formed, as in the inventive examples, with a carbonitrided layer having a carbon content of 0.80 wt % or more and a Lockwell hardness HRC of 58 or more, and in which the retained austenite quantity in the carbonitrided layer was outside the range of the invention; and tapered roller bearings (comparative examples 9-11, in Table 12) were prepared in which although the retained austenite quantity in the carbonitrided layer was in the range of the invention, the edge crown width exceeded the range of the invention or a full crown was formed throughout the width of the inner ring raceway surface. In the comparative examples 6 and 8, the width of the edge crown also exceeded the range of the invention. Further, a tapered roller bearing (the comparative example 12, in Table 12) was prepared in which the retained austenite quantity and the edge crown width were in the range of the invention and the heat treatment was the normal carburization hardening alone. Each bearing size is the same as in the inventive examples.

The tapered roller bearings of the above-mentioned inventive and comparative examples were subjected to a foreign matter mixed-in life test in which the bearing was attached to a rotative shaft disposed in a case having a lubricating oil with foreign matter mixed therein. The test conditions are as follows.

Load: 11.76 kN.

Number of revolutions: 1500 rpm.

Lubricating oil: Turbine VG56 (oil bath).

Foreign matter: gas-atomize metal powder (particle diameter 100-180, hardness HV 700-800, mixed-in quantity: 1 g/liter).

The test results are shown in Table 12. The life ratio employed as a reference value the durability life of the comparative example 8 in which the heat treatment was the normal carburization hardening and the durability life of each tapered roller bearing was evaluated in terms of $L_{10}$ life (hours for which 90% of the bearings were usable without being broken). In addition, "seizure yes" in the table shows that any seizure has occurred in the middle of the raceway surface.

In the tapered roller bearings of the inventive examples, it is seen that all exhibited superior durability life having four times or more as high life ratio and that seizure does not occur in the raceway surface middle. On the other hand, in the comparative examples 5-8 in which the retained austenite quantity is outside the range of the invention, the life ratio is about half that of the tapered roller bearings of the inventive examples. In the comparative examples 6 and 8 having a large crown width, seizure occurs in the raceway surface middle. Further, in the comparative examples 9 and 10, although the life ratio is superior, seizure occurs in the raceway surface middle. Further, in the comparative examples 9 and 10 in which the retained austenite quantity is in the range of the invention and the crown width is large, seizure occurs in the raceway surface middle although the life ratio is superior. In the comparative example 11 having an extremely small drop quantity $d_2$, peeling occurs in the end of the raceway surface, showing little improvement in life ratio.

TABLE 12

| Test bearing | Heat treatment | Retained austenite quantity (%) | Crown quantity $w_c/w$ (%) | Drop quantity $d_2$ (μm) | Life ratio | Seizure |
|---|---|---|---|---|---|---|
| Inventive example 5 | Carbonitriding | 25 | 10 | 20 | 4.0 | No |
| Inventive example 6 | Carbonitriding | 27 | 14 | 20 | 4.9 | No |
| Inventive example 7 | Carbonitriding | 31 | 12 | 20 | 5.2 | No |
| Inventive example 8 | Carbonitriding | 32 | 15 | 20 | 5.0 | No |
| Inventive example 9 | Carbonitriding | 35 | 9 | 20 | 4.4 | No |
| Comparative example 5 | Carbonitriding | 20 | 15 | 20 | 2.3 | No |
| Comparative example 6 | Carbonitriding | 22 | 25 | 20 | 2.8 | Yes |
| Comparative example 7 | Carbonitriding | 40 | 15 | 20 | 2.7 | No |
| Comparative example 8 | Carbonitriding | 46 | 22 | 20 | 2.3 | yes |
| Comparative example 9 | Carbonitriding | 30 | 25 | 20 | 3.2 | Yes |
| Comparative example 10 | Carbonitriding | 30 | Full crown | 20 | 4.7 | Yes |
| Comparative example 11 | Carbonitriding | 30 | Full crown | 3 | 1.4 | No |
| Comparative example 12 | Carburizing | 28 | 13 | 20 | 1.0 | Yes |

Embodiments of the invention have so far been described, but the invention is not limited thereto and various modifications are possible. For example, the invention is also applicable to double row tapered roller bearings having two or more rows.

The embodiments and inventive examples disclosed this time are illustrative in all respects and should not be taken to be restrictive. The scope of the invention is indicated, not by the description given above, but by Claims, and includes meanings equivalent to those of Claims and changes within the scope of the invention.

What is claimed is:

1. A tapered roller bearing comprising an inner ring having a conical surface-like raceway surface in an outer periphery and formed with a cone back face rib and a cone front face rib on the opposite sides of the raceway, an outer ring having a conical surface-like raceway in an inner periphery, a plurality of tapered rollers interposed between the raceways of the inner and outer rings, and a cage for holding the tapered rollers in predetermined circumferential intervals, wherein a ratio $R/R_{BASE}$ of a radius of curvature R of a large end face of the tapered roller to a distance $R_{BASE}$ from an apex of cone of the tapered roller to a cone back face rib surface of the inner ring is set at 0.75 to 0.87, and wherein an end face deflection of the large end face of the tapered roller is 3 μm or less.

2. A tapered roller bearing as set forth in claim 1, wherein a surface roughness Ra of the tapered rollers is set at 0.02 μmRa or less.

3. A tapered roller bearing as set forth in claim 1, wherein at least one of the inner ring, the outer ring, and the tapered rollers, has a nitrogen rich layer in a surface layer, and the grain size number of the austenite crystal grains in said nitrogen rich layer exceeds number 10.

4. A tapered roller bearing as set forth in claim 3, wherein a breaking stress in said at least one of the inner ring, the outer ring, and the tapered rollers is 2650 Mpa or more.

5. A tapered roller bearing as set forth in claim 3, wherein a hydrogen content of said at least one of the inner ring, the outer ring, and the tapered rollers is 0.5 ppm or less.

6. A tapered roller bearing as set forth in claim 3, wherein a surface roughness Ra of the cone back face rib surface of the inner ring is set at 0.05 μm-0.20 μm.

7. A tapered roller bearing as set forth in claim 3, wherein a surface roughness Ra of the large end face of the tapered roller is set at 0.02 μm or less.

8. A tapered roller bearing as set forth in claim 1, wherein the opposite ends of the raceway surface of the inner ring are formed with edge crowns, and an edge crown width in each of the opposite ends of the raceway of the inner ring is 20% or less of a raceway surface width of the inner ring.

9. A tapered roller bearing as set forth in claim 8, wherein the breaking stress in at least one of the inner ring, the outer ring, and the tapered rollers is 2650 Mpa or more.

10. A tapered roller bearing as set forth in claim 8, wherein the hydrogen content of at least one of the inner ring, the outer ring, and the tapered rollers is 0.5 ppm or less.

11. A tapered roller bearing as set forth in claim 8, wherein a region of said inner ring raceway surface excluding the opposite ends formed with the edge crowns is formed with a center.

12. A tapered roller bearing as set forth in claim 8, wherein the surface roughness Ra of the large end face of the tapered rollers is 0.02 μmRa or less.

13. A tapered roller bearing as set forth in claim 1, wherein the surfaces of the inner ring, the outer ring, and the tapered rollers are each formed with a carbonitriding layer having a carbon content of 0.80 wt % or more and a Rockwell hardness HRC of 58 or more.

14. A tapered roller bearing as set forth in claim 13, wherein the surface roughness Ra of the cone back face rib surface of the inner ring is in the range of 0.05 μm-0.20 μm.

15. A tapered roller bearing as set forth in claim 13, wherein the surface roughness Ra of the large end face of the tapered roller is 0.02 μm or less.

16. A tapered roller bearing as set forth in claim 13, wherein a retained austenite quantity of the carbonitriding layer is 25-35 vol %, and the opposite ends of the raceway of the inner ring are formed with edge crowns, the width of the edge crowns at the opposite ends of the raceway of the inner ring being 20% or less of the raceway width of the inner ring.

17. A tapered roller bearing as set forth in claim 16, wherein the region of the inner ring raceway surface excluding the opposite ends formed with the edge crowns is formed with a center crown.

18. A tapered roller bearing as set forth in claim 16, wherein the surface roughness of the large end face of the tapered roller is 0.02 μmRa or less.

\* \* \* \* \*